United States Patent

[11] 3,602,994

| [72] | Inventor | John D. Layman |
| --- | --- | --- |
| | | Waynesboro, Va. |
| [21] | Appl. No. | 18,871 |
| [22] | Filed | Mar. 12, 1970 |
| [45] | Patented | Sept. 7, 1971 |
| [73] | Assignee | General Electric Company |

[54] PULSE GENERATOR SYSTEM RESPONSIVE TO SPINDLE MOTOR ROTATIONAL PHASE SIGNAL FOR PROVIDING DIGITAL PULSES AT RATE DEPENDENT UPON MOTOR SPEED
17 Claims, 17 Drawing Figs.

[52] U.S. Cl. ............................................ 328/134,
307/232, 307/295, 318/571, 328/109, 328/155
[51] Int. Cl. ......................................................... H03b 3/04,
H03d 3/02, H03k 9/06
[50] Field of Search........................................ 307/232,
295; 328/109, 110, 133, 134, 155, 63, 72; 318/39, 571

[56] References Cited
UNITED STATES PATENTS

| 2,964,252 | 12/1960 | Rosenberg | 318/571 X |
| --- | --- | --- | --- |
| 3,015,806 | 1/1962 | Wang et al. | 318/571 X |
| 3,156,907 | 11/1964 | Lanning et al. | 328/134 X |
| 3,206,616 | 9/1965 | Webb | 328/134 X |
| 3,211,896 | 10/1965 | Evans et al. | 318/571 X |
| 3,308,279 | 3/1967 | Kelling | 318/571 X |

*Primary Examiner*—Stanley D. Miller, Jr.
*Attorneys*—William S. Wolfe, Michael Masnik, Frank L. Neuhauser, Oscar B. Waddell and Joseph B. Forman

ABSTRACT: Apparatus responsive to a spindle motor develops velocity pulses for application to a numerical control system. The velocity pulses are generated at a rate proportional to the rotational rate of the spindle motor. The motor rotational position is converted to an asynchronous waveform which is synchronized and phase compared to a reference waveform. The phase difference is stored in complement form by an up counter. A number of pulses dependent upon the up counter contents is metered out at a maximum rate controlled by a signal from the numerical control system. Scaling means controls the relation between phase difference and number of pulses generated.

INVENTOR.
JOHN D. LAYMAN
BY Michael Masnik
HIS ATTORNEY

INPUT PHASE SENSING & DETECTION TIMING PATTERNS

FIG. 3b

INVENTOR.
JOHN D. LAYMAN
BY Michael Masnik
HIS ATTORNEY

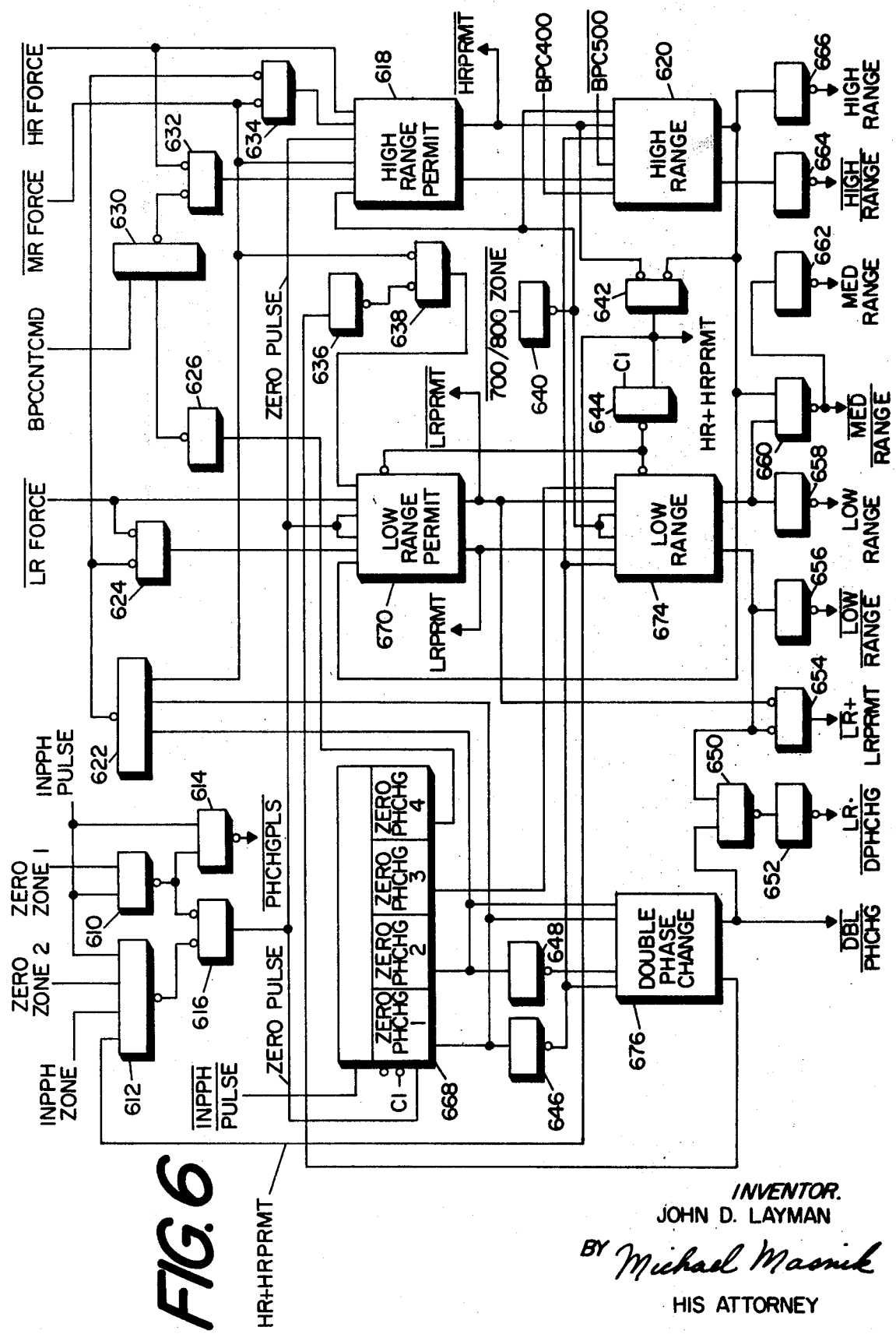

3,602,994

PULSE GENERATOR SYSTEM RESPONSIVE TO SPINDLE MOTOR ROTATIONAL PHASE SIGNAL FOR PROVIDING DIGITAL PULSES AT RATE DEPENDENT UPON MOTOR SPEED

BACKGROUND OF THE INVENTION

1. Field of Invention

The invention is the field of numerical control systems and more particularly concerns a system responsive to the asynchronous phase signal representing rotation of a spindle motor for generating digital pulses at a rate dependent upon motor rotational speed.

2. Description of the Prior Art

In numerical control systems, the relative movement of a workpiece and a machine tool is controlled by programmed input signals. Velocity pulses are developed which control the rate of movement in a well-known manner. In this general art field, systems are well known for generating digital pulses related to the rotation of a motor. Such prior art systems are based upon a phase detection scheme. Such prior art systems, while useful for their intended purpose, are not perfectly suitable for generating threadcutting or inches per revolution pulses to be applied to a conventional numerical control system for use in controlling velocity of movement of a cutting tool relative to a workpiece rotated by a spindle motor.

The prior art systems generally required complex and expensive photoelectric shaft pulse generators which require critical coaxial cable connections for the pulse transmission from machine to control. Further, these systems did not provide for automatic speed range selection.

SUMMARY OF THE INVENTION

In accordance with the present invention, a waveform having a phase dependent on the rotational position of the spindle motor is synchronized with the system clock and compared at distinct comparison periods with a reference waveform. The sense of the phase difference is stored and also an indication of the amount of phase difference is stored. Phase difference storage is performed by an up counter which records a complement of the detected phase difference. After the comparison period, output pulses are metered out from the up counter at a maximum rate controlled by the circulation time of a conventional numerical control system. Feedback pulses, corresponding to output pulses, count up the up counter to its initial rest position at which point no further output pulses are generated. At the same time that output pulses are generated, the reference waveform is altered in phase so that during the next comparison period the phase difference detected is due entirely to the phase change occurring between consecutive comparison periods.

Automatic scaling means, responsive to the motor rotational speed, is also provided to scale up or scale down the number of output pulses generated for a given phase difference. Also, at low motor speeds, wherein the number of phase difference detections is relatively low with relatively large time spacings therebetween, means are provided for substantially evenly spreading the output pulses between detected phase differences to provide a smooth output pulse rate.

BRIEF DESCRIPTION OF THE DRAWINGS

FIG. 3a, 3b and 3c are pulse waveforms illustrating logic signals which are developed by and occur at various identified points in the detailed logic diagrams of FIGS. 1, 2 and 3.

FIG. 6 is a detailed logic diagram of apparatus for responding to signals indicating motor rotational speed and for developing control signals for switching between low, medium and high range operation.

DETAILED DESCRIPTION OF THE DRAWINGS

The basic pulse generator system operates to generate pulses which are related to the speed of a motor. In the specific example of a threadcutting operation, the motor would be the motor which turns a lathe, the lathe holding an element to be threadcut. Typically, a prior art type numerical control system receives velocity pulses which are applied to the numerical control system. The numerical control system moves the cutting tool with respect to the lathe so that the threads are cut on the workpiece. In accordance with the specific example of the system of the invention, the pulses applied to the numerical control system are derived from the rate of revolution of the lathe motor. Thus, the pulses applied to the numerical control system will be related to inches per revolution rather than inches per minute.

The basic concept of this invention need not be used in a threadcutting operation but may be used in any type of operation where it is desired to obtain digital pulses having a pulse repetition rate related to any rotational, or linear velocity or indeed to the derivative of any quantity expressed as a phase relationship of an input signal to a reference signal whether said quantity be a physical position or angle or whether it be representative of temperature, pressure, radiation, density, etc., as long as this information is in phase form.

Figure 9:
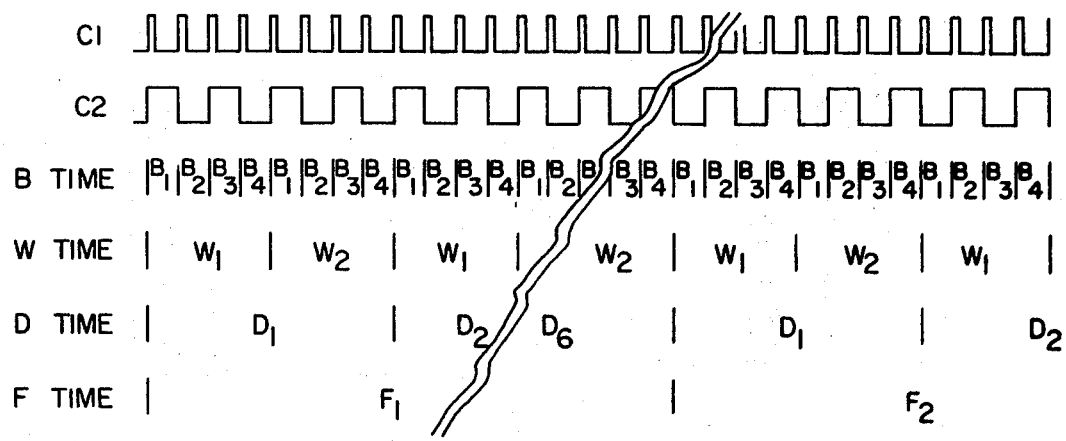
FIG. 9 is an illustration of timing signals and their relation to a system clock $C_1$. The timing signals illustrate one example of the timing of events in the specific examples of detailed logic illustrated in other drawings.

The timing signals for operation of the specific embodiment of the invention is illustrated in FIG. 9. All timing in the pulse generator is based upon a clock $C_1$ which, in the specific example, has a period of 200 nanoseconds. A $C_2$ clock which is derived from the $C_1$ clock has a 400-nanosecond cycle. The basic pulse generator also receives a system sync signal, otherwise referred to as an end of circulation (EOC) signal from the numerical control system. The numerical control system as is well known in the art performs arithmetic functions at a clocked circulation rate. Each circulation cycle takes six function (F) times, $F_1$–$F_6$; each function time takes six digit (D) times, $D_1$–$D_6$; each digit time takes two word (W) times, $W_1$–$W_2$; each word time takes four bit (B) times, $B_1$–$B_4$; and each bit time corresponds to a single $C_1$ clock period. The numerical control system is adapted so that it cannot receive more than one input velocity pulse during each circulation cycle. Thus, the EOC signal as applied to the pulse generator of the present invention ensures that the pulse generator does not provide more than one pulse per circulation cycle of the numerical control system.

Figure 8:
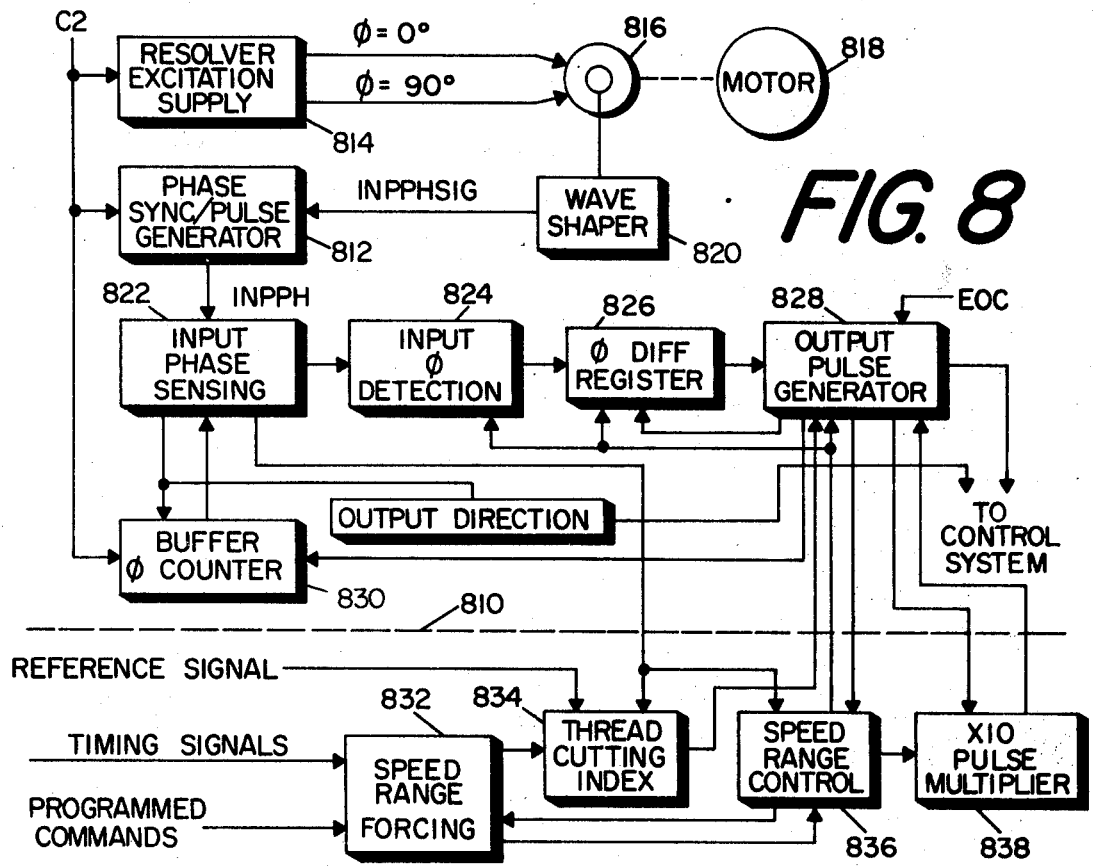
FIG. 8 is a general block diagram illustrating a preferred embodiment of the present invention.

FIG. 8 shows a general block diagram of the basic pulse generator circuit. The blocks shown above the broken line 810 cooperate with scaling control apparatus and mode control apparatus shown below line 810 to generate output pulses which are applied to a conventional numerical control system. The phase pulse generator 812 receives the asynchronous input phase signal, INPPHSIG, from a wave shaper 820 which is fed by a resolver 816 connected to the spindle motor 818. The resolver 816 is fed by the zero and 90° phase waveforms of the reference resolver excitation signal taken from a supply source 814 which is synchronized to clock $C_2$. In the example described, the supply output is a pair of sinusoidal signals, 90° out of phase, each having a period equal to $1,000C_2$. The sinusoidal output waveform from resolver 816 has a phase which follows the rotation of motor 818 and is shaped into a corresponding square waveform by shaper 820. The phase of the asynchronous phase signal is synchronized with the clock $C_2$ and an output pulse, INPPH, having a short duration and occurring at a time related to the phase of the input phase signal and the clock $C_2$, is generated. A buffer phase counter 830 which normally counts at the $C_2$ rate provides a reference phase waveform having a frequency equal to the frequency of the signal applied to the aforementioned resolver. At a specified time during each cycle of the buffer phase counter 830, referred to hereinafter as the interphase zone, a phase comparison is made between the reference phase from the buffer phase counter 830 and the input phase pulse representing the resolver phase. The interphase zone during medium range operation covers $10$ $C_2$ clock times on both sides of zero for the buffer phase counter 830. That is, in the specific example to be described herein, the buffer phase counter counts from zero to 999 and recycles. The interphase zone, during which phase measurement is accomplished, occurs during times 990 to 009 inclusive.

It should be noted, and this will be explained more fully hereafter, that the phase difference between the input phase pulse and the reference waveform represents the phase change that resulted during a single cycle (400 microseconds) of the reference waveform cycle, hereinafter sometimes referred to as the excitation cycle. This is because the buffer phase counter 830 is effectively updated after each phase detection so as to be in phase with the asynchronous square waveform. The input phase sensing means 822 and the input phase detection means 824 operate together to generate a pulse having a sense which is dependent upon whether the input phase pulse leads or lags the reference phase and a duration which is dependent upon the amount of phase difference. A phase difference register 826 operates to store a count which is dependent upon the amount of phase difference. In the specific example described herein, each unit of phase difference represents a phase difference of 400 nanoseconds (the one cycle time for clock $C_2$). The purpose of the phase difference register 826 is to allow storage of the phase difference pulses when they are generated and detected during the interphase zone and to allow metering out of these or equivalent pulses after measurement is over and at a more uniform rate. The signal from the input phase detection means 824 which gates $C_2$ clock pulses into the phase difference register 826 in a gating signal which has a duration equal to the 10's complement of the detected phase difference. Thus, if a phase difference of two units is detected, the phase difference register will receive eight $C_2$ pulses, whereas if a phase difference of four units is detected, the phase difference register will receive six $C_2$ pulses. When the phase difference register 826 is loaded and the interphase zone is over, an output pulse generator 828 sends an output pulse feedback signal to the phase difference register 826 thereby causing the phase difference register 826 to count up to its original position of nine. Each count of the phase difference register during this time results in an output pulse from the output pulse generator 828. Metering out the counts is controlled by the EOC pulse to ensure that a maximum of one output pulse per circulation cycle of the numerical control system is generated. The output pulses are also used to update the buffer phase counter 830 to place the reference waveform in phase with the asynchronous waveform. This is done by causing the buffer phase counter to gain an extra count for each output pulse if the buffer phase counter 830 is to be advanced in phase or to omit a count if the buffer phase counter is to be delayed in phase.

The scaling function, also a feature of the present invention, relates to the rate of rotation of the motor. For example, assuming a medium range of rotation for the motor, the scaling function is 1 to 1. Basically, in the specific embodiment herein, that means that if the detected phase difference is $n$ units, the output pulse generator 828 will send $n$ pulses to the numerical control system during the next excitation cycle. However, if the motor is operating at extremely high rates, the phase difference detected at the end of each excitation cycle will be great and if the scale factor is still one to one, there will be a very large number of pulses sent to the numerical control system. This condition cannot be accommodated by the numerical control system so instead of sending out one pulse for each unit of phase difference, at high range the scale is 10 to 1 and a single pulse is sent out to the numerical control system for every 10 units of phase difference detected. It will also be noted that as is common in numerical control systems, the numerical control system also includes a scale factor whereby in this condition each pulse represents a command distance of 10 times the medium range command distance. Consequently, at high range, a tenth of the pulses will be sent out but each pulse will represent 10 times as much command distance. During low range when the motor is operating at a very low rate just the opposite condition is created. That is, the scale is set at 1 to 10 and 10 pulses are generated by the output circuit for each unit phase difference which is detected.

The range control mentioned above is provided by a speed range control circuit 836 which provides low, medium and high range control signals to the pulse generator circuitry above broken line 810. Range selection is accomplished by monitoring the motor r.p.m.'s and generating the proper range control signals depending upon the detected range of the motor r.p.m.'s. The motor r.p.m.'s is monitored in the speed range control circuit by detecting the number of consecutive phase changes or consecutive no-phase changes for consecutive excitation cycles. The r.p.m.'s, in the specific instance of high range operation, is monitored by detecting the number of units of phase difference occurring during a single excitation cycle.

An X10 pulse multiplier 838 is also provided for use only during low range operation. As mentioned above, during low range, the motor is turning at low r.p.m.'s (e.g., 0–50/75 r.p.m.) and 10 output pulses are to be generated for each detected unit of phase difference. Because of low r.p.m. of the motor, a single unit of phase difference is the most that will be detected during one excitation cycle and consecutive phase change detections will typically be a number of excitation cycles apart. The pulse multiplier 838 operates to provide ten evenly spaced output pulses between successive phase change detections. An output rate from the pulse multiplier 838 controls the output rate from the output pulse generator 828.

A speed range forcing circuit 832 is responsive to commands in a program input (typically the program input to the numerical control system) to override the r.p.m. sensing feature of the speed range control circuit 836 and to force either low, medium or high range operation.

In the specific example to be described herein, the invention provides pulses to a numerical control system for either threadcutting operation or for some other inches per revolution operation. Threadcutting is indicated by a control signal THC MODE being at logic 1 whereas IPR operation is indicated by a control signal THC MODE being at logic 1. The above control signals appear in some of the detailed logic drawings explained below. For threadcutting operations the motor holding the workpiece which is to be threaded should be brought to a reference angular position or index before the output pulses are applied to the numerical control system. A threadcutting index circuit 834 is provided for this purpose.

A specific example of detailed logic forming the system of FIG. 8 is illustrated in FIGS. 1 through 7. In those drawings, the following conventions are used:

The logic signals will be referred to respectively as either high or low, positive or negative, one or zero. All logic gates are of the NAND type. That is, if and only if all of the input lines to the logic gate are high, the output is low. On the other hand, any low input to the logic gate will drive the output high. All of the flip-flop blocks shown in the logic diagrams are triggered by the clock $C_1$, a trigger input not being shown. Whether or not the trigger causes the flip-flop to change states depends upon whether or not all of the steering conditions to the set or reset side of the flip-flop are in the positive state. The set side of every flip-flop is on the left and the reset side of every flip-flop is on the right. The shift registers, e.g., register 668 in FIG. 6, are shifted by a $C_1$ clock pulse and a negative logic level on the upper input thereto. The bit shifted into the first stage depends upon the logic 1 or logic 0 condition of the lower input to the shift register. Every $\overline{SIGNAL}$ is the logic opposite of every SIGNAL.

Figure 3:
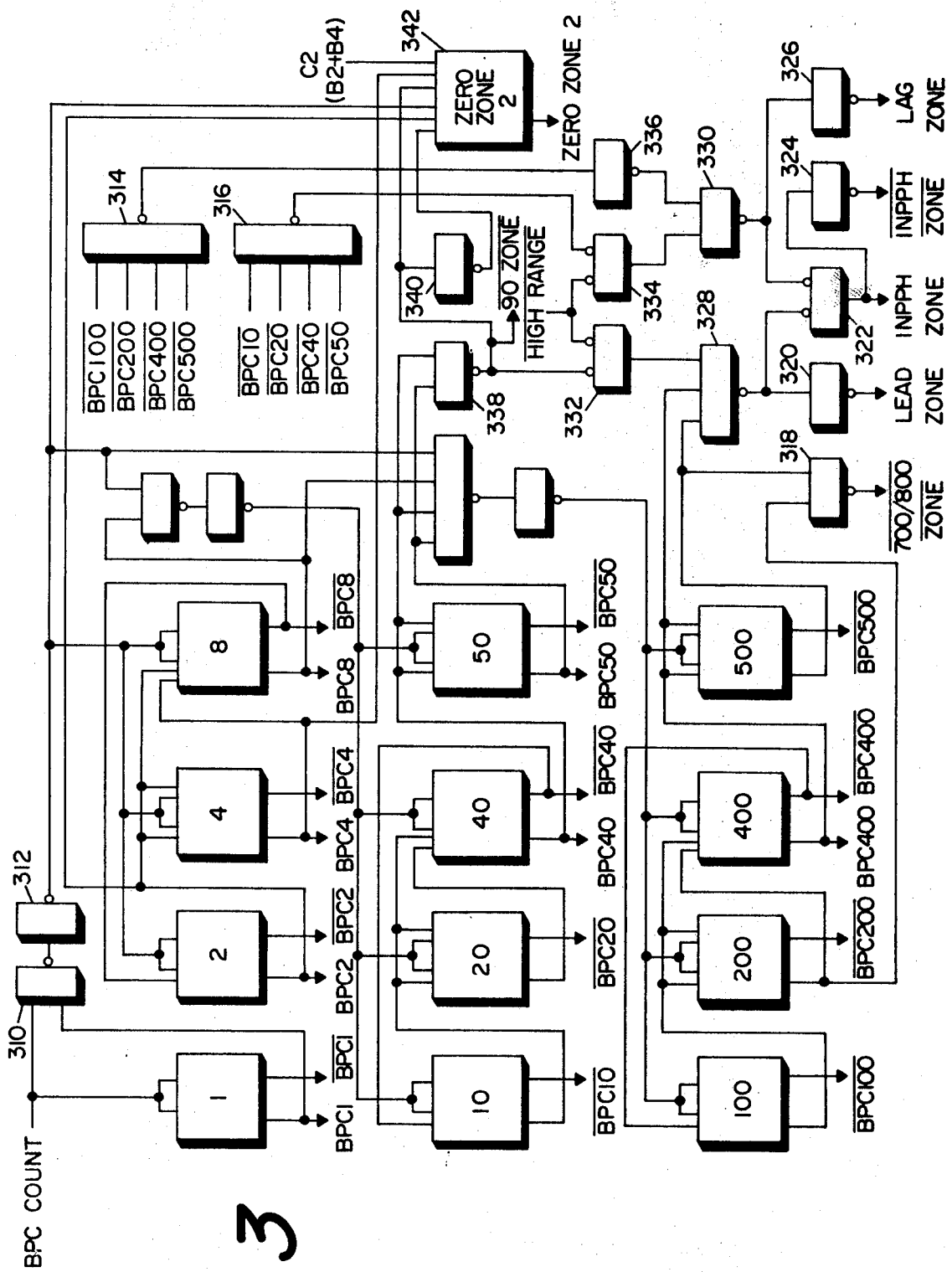
FIG. 3 is a detailed logic diagram of apparatus for generating a reference waveform and for generating timing zone signals.
Figure 3A:
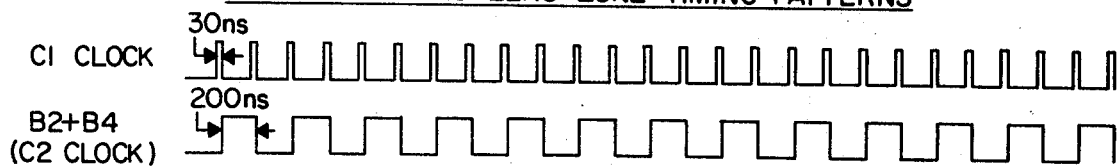
Figure 3A:
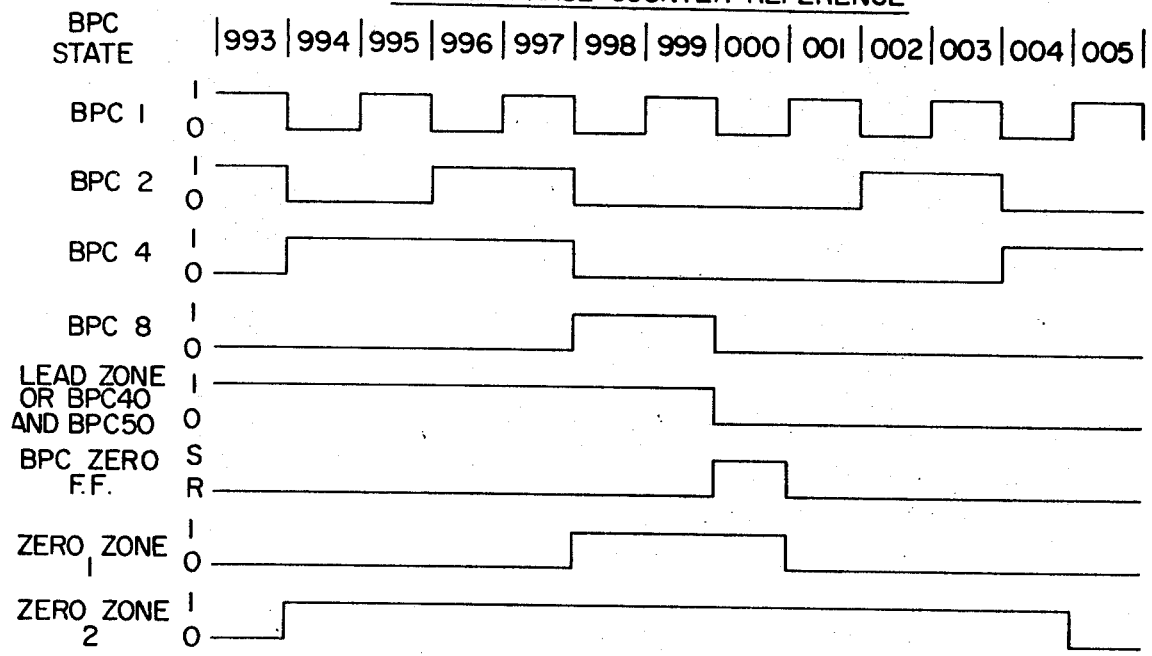
Figure 3A:
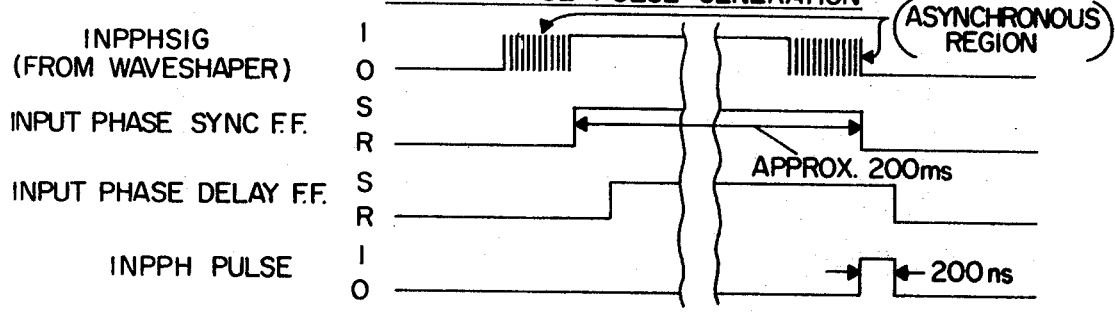

The buffer phase counter 830 which provides the reference phase for the operation of the present invention is illustrated in FIG. 3. Some of the signals generated by the buffer phase counter, and indicated by alphanumeric legends on the respective lead lines are illustrated in FIG. 3a. For the present, it may be assumed that the BPC count input to the buffer phase counter is the same as the $C_2$ clock pulses. With this condition, the rate at which the buffer phase counter counts would be the same as the rate of the $C_2$ clock. As is apparent from the logic, the decade including flip-flops 1, 2, 4 and 8 counts from zero to nine and then recycles to zero. After the ninth input, the second decade which includes flip-flops 10, 20, 40 and 50 is initiated. It can be seen that the entire buffer phase counter counts from 000 to 999 and recycles. Thus, at the $C_2$ clock rate, the period of the buffer phase counter will be 400 microseconds (1,000 times 400 nanoseconds). The buffer phase counter in combination with gates 320, 322, 324, 328, 330, 332, 334, 336, 338, 316, and 314 generates a lead zone which lasts from BPC 990 through BPC 999 and a lag zone which lasts from BPC 000 through BPC 009. It is during this interphase zone that the phase difference measurement is accomplished. It will be noted that during high range operation, the $\overline{HIGH\ RANGE}$ input to gates 334 and 332 will be low thereby extending the lead zone to cover BPC 900 to BPC 999 and extending the lag zone to cover BPC 000 to BPC 099. Consequently, INPPH ZONE will last from BPC 900 to BPC 099 during high range operation. Since these zones are used to measure phase difference, the time during which phase difference can be detected is ten times greater during high range operation.

The buffer phase counter in cooperation with gate 318 generates a $\overline{700/800\ ZONE}$ timing signal which defines a time zone from BPC 700 through BPC 899 once each excitation cycle. The use of this timing signal will be explained below.

Figure 1:
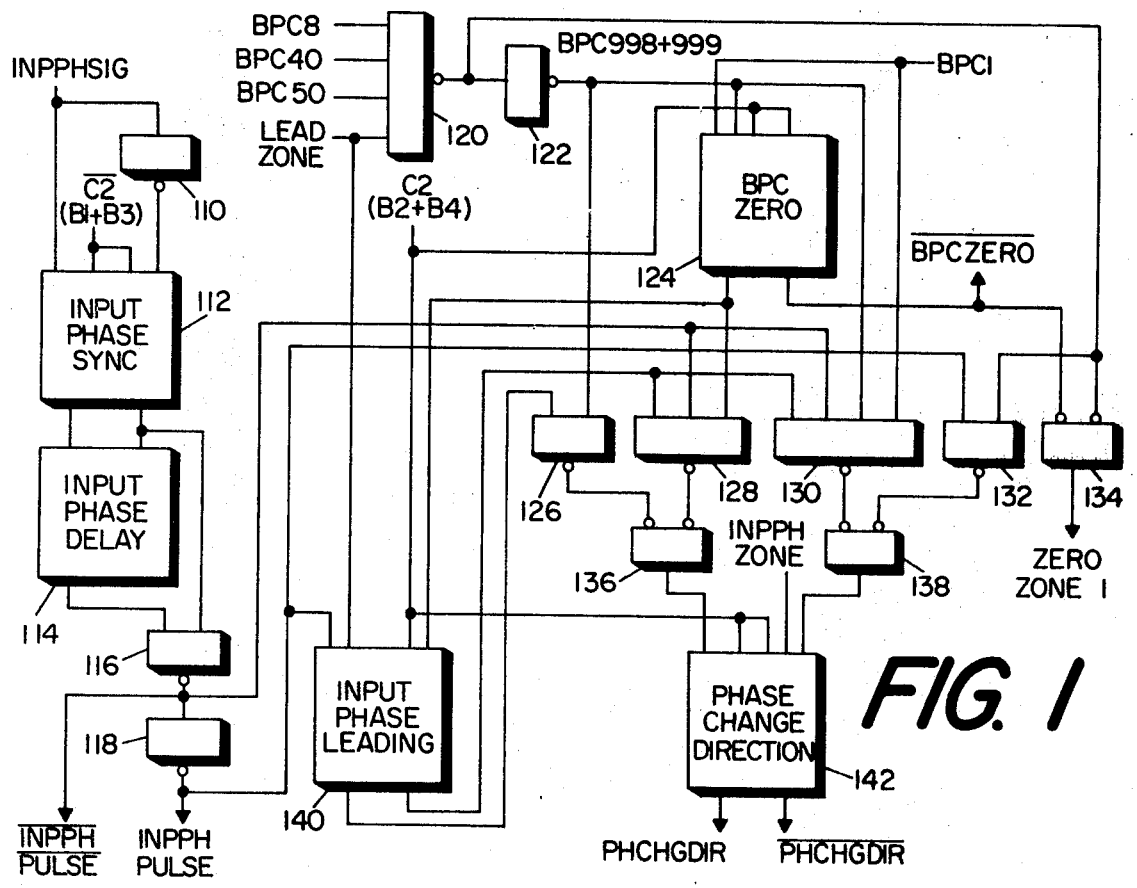
FIG. 1 is a detailed logic diagram showing apparatus for synchronizing an input asynchronous waveform and for detecting and storing an indication of the sense of the phase difference between a reference waveform and a synchronized pulse.

The asynchronous input waveform from the wave shaper 820 (FIG. 8) is synchronized to the $C_2$ clock by the input phase pulse synchronizer which is shown in detail in the left-hand side of FIG. 1. The asynchronous waveform is represented by the legend INPPHSIG. A synchronized input phase pulse (INPPH) is generated in response to the input phase signal going from positive to negative and in response to the synchronization of the clock signal $C_2$. With the input phase signal at the positive portion of its cycle, the input phase sync flip-flop 112 will be in the set condition and the INPPH output of gate 118 will be low. When the input phase signal goes low, one of the conditions necessary for resetting the input phase sync flip-flop 112 is present. The other condition occurs when the inverted clock signal $\overline{C_2}$ goes positive. When these two conditions occur, the input phase sync flip-flop 112 will be reset in response to the next $C_1$ clock pulse. When the input phase sync flip-flop 112 is reset, the INPPH output will immediately go high and will remain high for the delay time caused by the input phase delay flip-flop 114. After the delay time, which is due to the 200-nanosecond period $C_1$ clock trigger (not shown) the input phase delay flip-flop 114 will be reset thereby removing the condition necessary for maintaining the INPPH output at a high level. The timing sequence described above is illustrated in FIG. 3a by the bottom four waveforms of that figures.

The input phase pulse (INPPH) is compared with the reference waveform generated by the buffer phase counter during the interphase zone. During the interphase zone the input phase sensing circuit, shown in FIG. 1, operates to generate logic signals indicative of the phase sense, i.e., whether the input phase pulse is leading or lagging the reference. The input phase sensing logic of FIG. 1 includes three flip-flops; a BPC zero flip-flop 124, an input phase leading flip-flop 140, and a phase change direction flip-flop 142. The BPC zero flip-flop provides an output pulse which spans time BPC 000. Its output is also combined with times 998 and 999 at gate 134 to generate a zero zone 1 output pulse which covers times 998, 999 and 000. Referring back to FIG. 3, a zero zone 2 output is generated by a zero zone 2 flip-flop 342. The zero zone 2 output signal is high from BPC 994 through BPC 004. The zero zones define the region about BPC reference phase which for purposes of the invention is considered to be at zero phase. Zero zone 1 is used for this purpose during low and medium range operation. Zero zone 2 is used for this purpose during high range operation. For example, during low or medium range operation, if the phase pulse INPPH arrives during zero zone 1, then there is no phase difference (zero phase) detected for the current excitation cycle. During high range, zero phase is detected whenever the INPPH pulse is coincident with zero zone 2.

Figure 3B:
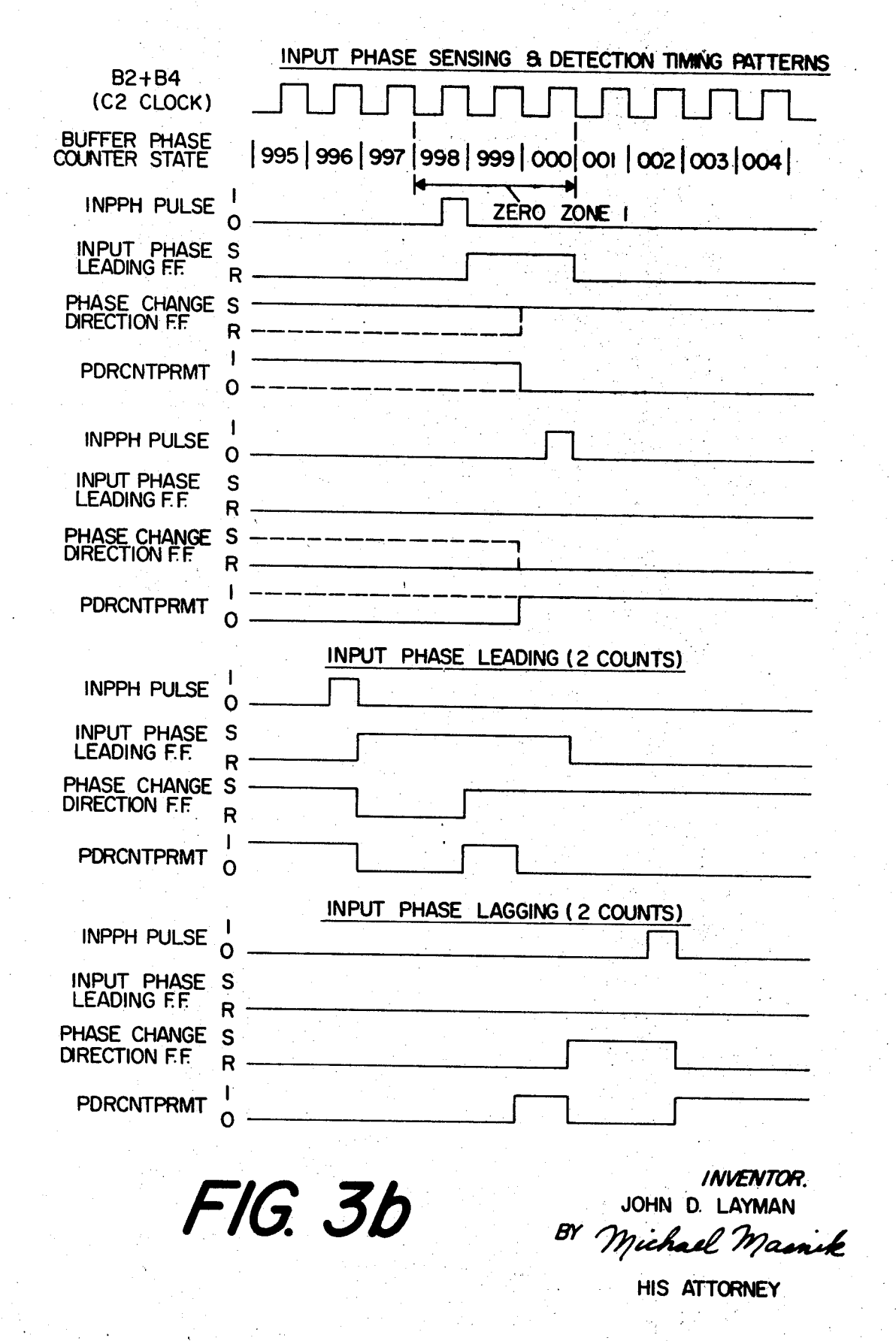

If the input phase pulse arrives during the lead zone the input phase leading flip-flop 140 will be set and will remain in the set condition until reset at time BPC 000. Thus, a set output from the input phase leading flip-flop 140 occurs only if the input phase pulse leads the reference phase and the duration of the set pulse is a measure of the phase lead. The logic for controlling the phase change direction flip-flop 142 has a dead zone built into it to accommodate any phase jitter. Thus, if the input phase pulse occurs at any of times 998, 999, and 000, the input phase pulse is considered to be in phase with the reference waveform and consequently no output pulses will be generated by the invention. An example of an output pulse occurring during this dead time is illustrated in FIG. 3b by the first example wherein the input pulse is shown as arriving at time 998 of zero zone 1. Since the input phase pulse occurs during the lead zone, the input phase leading flip-flop 140 will be set. Also, the set output of the input phase leading flip-flop is ANDed with BPC 998 and 999 to set the phase change direction flip-flop 182 if it is not already in the set condition. A second example is shown in FIG. 3b where the input phase pulse arrives during BPC 000. There, the input phase leading flip-flop 140 will not be set. The phase change direction flip-flop 142 will be reset, if not already in the reset condition, by the input phase pulse occurring outside of the time zone BPC 998, 999.

If the input phase pulse occurs outside of zero zone 1, this condition is detected as a phase lead or a phase lag and the phase change direction flip-flop 142 is triggered twice to provide an output pulse which indicates the amount of phase lead or the amount of phase lag. The case of a phase lead corresponding to two counts, i.e., the input phase pulse arrives at time BPC 996, is illustrated in the third example of FIG. 3b. When the input phase pulse arrives, the input phase leading flip-flop 140 is set and remains set until BPC 000. The input phase pulse also resets the phase change direction flip-flop 142 if it is not already in the reset condition. Since the input phase leading flip-flop 140 is in the set condition, the phase change direction flip-flop 142 is set at the end of BPC 998. The input phase leading flip-flop 140 is then reset, as always is the case, at BPC 000.

The fourth example in FIG. 3b illustrates the case of the input phase pulse lagging the reference phase by two counts, i.e., arriving at time BPC 002. In this case, the input phase leading flip-flop 140 will remain reset. At time BPC 000, with the input phase leading flip-flop 140 in the reset condition, the phase change direction flip-flop 142 will be set. It will remain in a set state for two counts until it is reset by the arriving input phase pulse.

Figure 2:
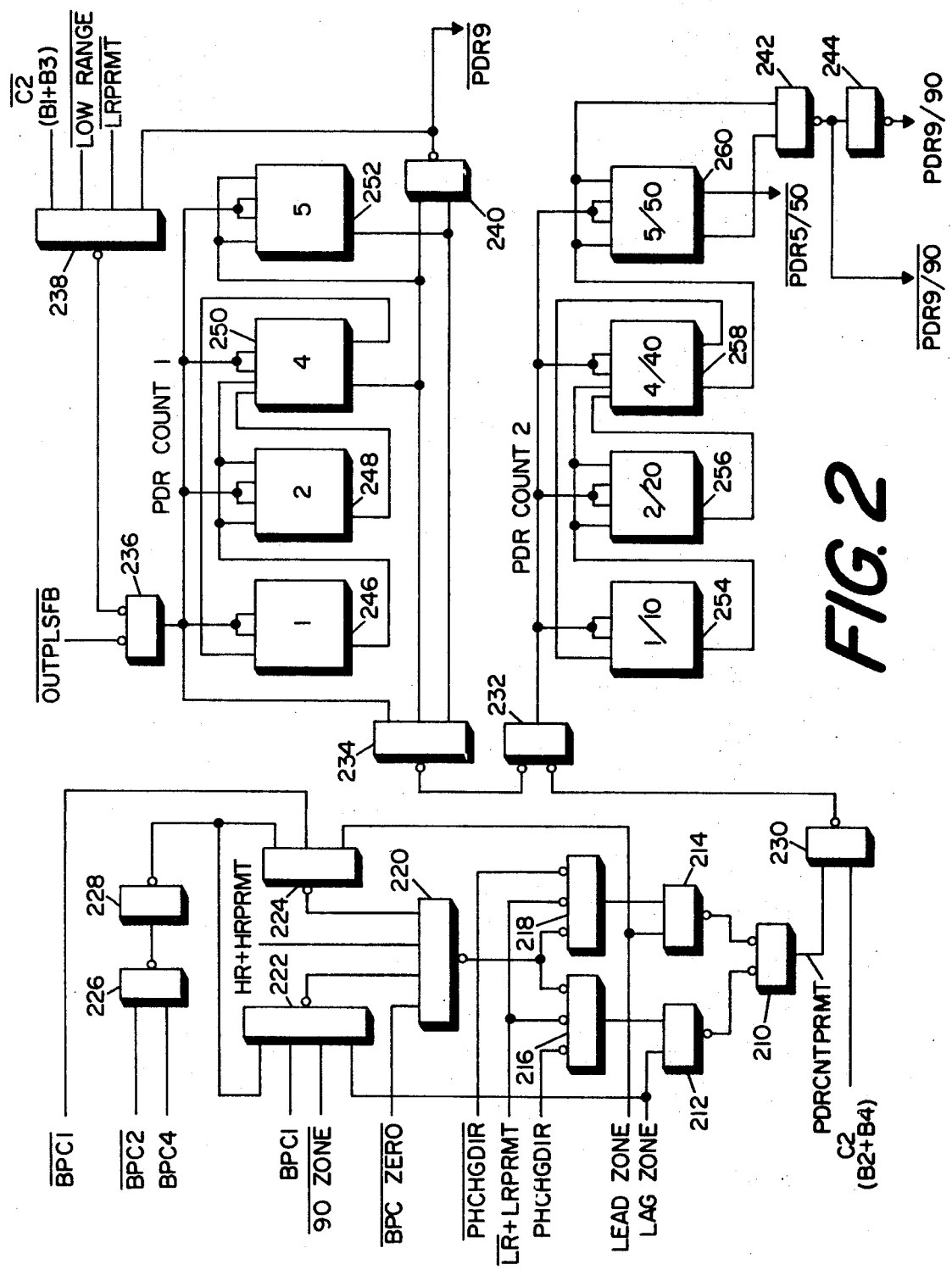
FIG. 2 is a detailed logic diagram showing apparatus for generating a number of pulses equal to the complement of a detected phase difference and apparatus for storing said pulses and counting out a number of pulses equal to said phase difference.

The phase change direction output (PHCHGDIR) from the input phase sensing circuit of FIG. 1 is applied to the phase change detection circuits shown in FIG. 2. The phase change detection circuit operates to generate a phase difference register count permit gate (PDRCNTPRMT) at the output of gate 210 which permits $C_2$ clock pulses to be gated into a phase difference register which is also shown in FIG. 2. The PDRCNTPRMT pulse which is generated has a duration which is the complement of the detected phase difference. Consequently, the number of $C_2$ pulses applied to and stored in the phase difference register will be the 10's complement of the phase difference count.

For low and medium range operation, the output of gate 220 will remain at logic 1. Also the input $\overline{LR+LRPRMT}$ will normally be at logic 1. Thus the generation of PDRCNTPRMT will be under control of inputs PHCHGDIR, $\overline{PHCHGDIR}$, LEAD ZONE and LAG ZONE. During the lead zone, gates 214 and 218 control gate 210. When LEAD ZONE occurs, gate 214 has a logic 1 applied to one of its inputs. The second input to gate 214 will be at logic 1 only if $\overline{PHCHGDIR}$ is at logic 0, i.e., PHCHGDIR is high. From the example of a phase lead of two counts, shown in FIG. 3b, it is seen that for a phase lead PHCHGDIR is high for the entire LEAD ZONE except for a time equal to the phase lead. Consequently, for the example of a phase lead of two counts, PDRCNTPRMT will be at logic 1 for eight of the ten counts ($C_2$ clock pulses) of the LEAD ZONE. Eight $C_2$ clock pulses, the 10's complement of the detected phase difference, will be gated through gates 230 and 232 into the phase difference register. During the LAG ZONE, the gates 216 and 212 control gate 210 to generate PDRCNTPRMT in the same manner.

Figure 3C:
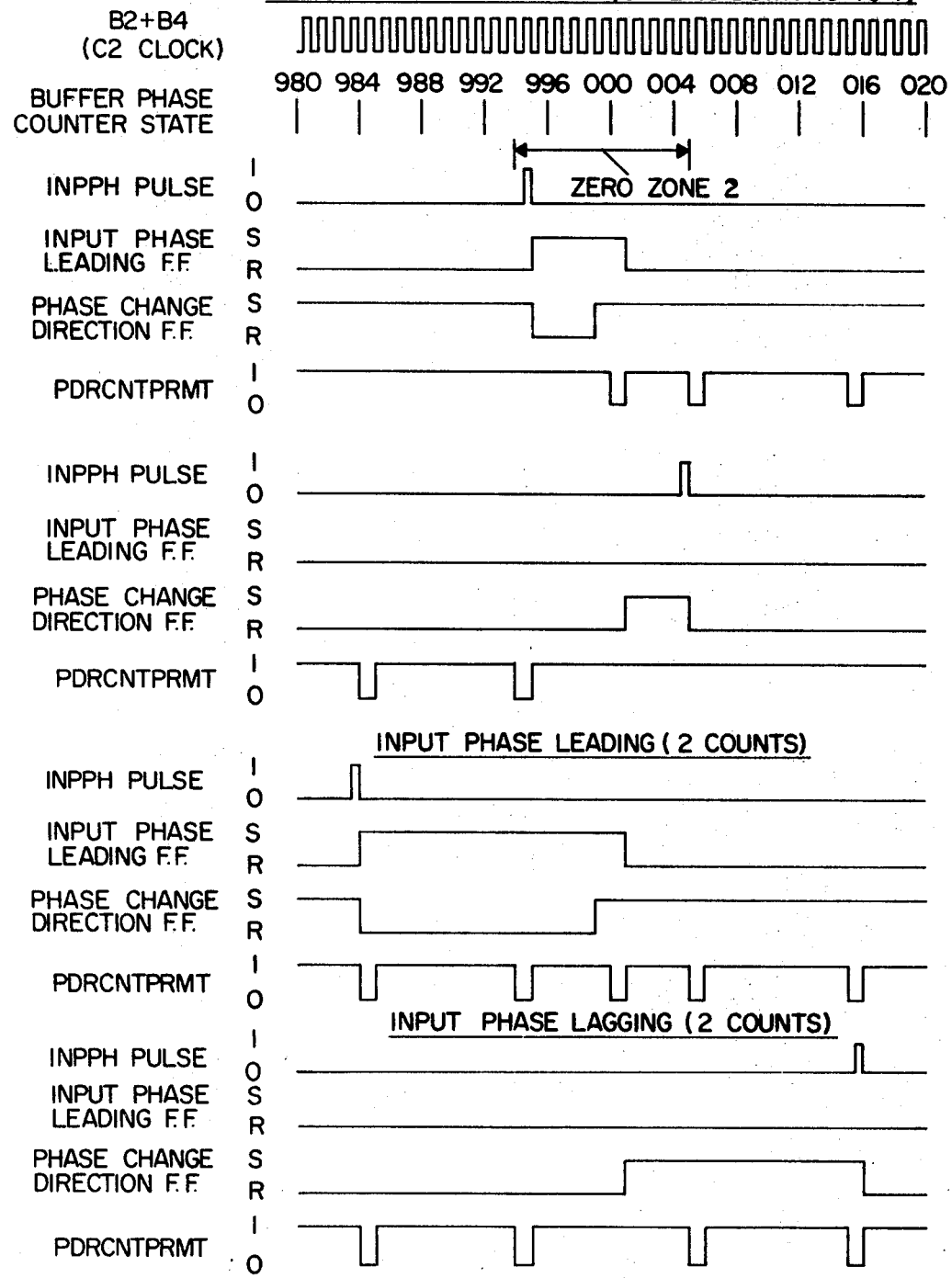

The $C_2$ pulses are counted by a 1—2—4—5 decade counter of the phase difference register comprising stages 254, 256, 258 and 260. The decade is at rest at a count of nine, i.e., stages 258 and 260 in the set condition. During high range operation, the generation of PDRCNTPRMT is controlled also by gates 220, 222, 224, 226 and 228. As will be remembered from the above description of FIG. 3, the LAG and LEAD zones will be 10 times wider for high range. The logic operates to raise PDRCNTPRMT to a logic 1 during the LEAD and LAG zones to repetitively add ten counts to the decade counter of the phase difference register except that a phase lead or phase lag results in elimination of counts applied to the decade counter. As pointed out above, for high range operation, ten units of phase difference ($C_2$ clock times) generates a single output pulse from the system. For the logic of FIG. 2, a phase difference of 20 units, as shown in FIG. 3c, results in two $C_2$ clock pulses being blocked from the decade counter. Thus, the decade will receive 98 counts and register a count of seven, i.e., two more counts needed to bring the decade back to its rest position of nine. It should be noted that the repetitive application of 10 $C_2$ pulses to the decade during the interphase zone has no ultimate effect on the decade counter since every 10 pulses completely recycles the decade counter.

The purpose of the phase difference register illustrated in detail in FIG. 2 is to receive and store a count which is related to the phase difference detected during the interphase zone and to control the number of output pulses generated by the pulse generator. The phase difference register includes a pair of decade up counters which are illustrated as being the upper decade and the lower decade. The upper decade includes stages 246, 248, 250 and 252 and primarily serves the function during low range operation to increasing the total number of output pulses or during high range operation increasing the updating pulses to the buffer phase counter between interphase zones. The lower decade receives the $C_2$ clock pulses gated therein by PDRCNTPRMT as explained above.

The count registered by the lower decade at the end of the interphase zone will be below the rest condition of nine by a number equal to the phase difference detected during said interphase zone. Thus, for a phase difference of one unit (one $C_2$ clock time for low and medium range; 10 $C_2$ clock times for high range) the lower decade will read a count of eight. (Two points should be noted here. First, during low range a maximum of one unit of phase difference will be detected during any interphase zone. Also, when the metering out rate of the pulse generator is too slow, the lower decade may not return to its rest condition prior to the next interphase zone.)

The upper decade counter also has a rest position corresponding to a count of nine with states 250 and 252 set and $\overline{PDR9}$ at a logic 0. This decade counter is not affected by the PDRCNTPRMT gated $C_2$ clock pulses during the interphase zone. Its function is to increase the number of output pulses tenfold during low range operation or to increase the number of feedback (or updating) pulses to the buffer phase counter tenfold during high range operation.

Generation of the output pulses and feedback pulses OUTPLSFB will be described in connection with FIG. 4. However, it should be noted here, in order to appreciate the control function of the phase difference register, that after the interphase zone, when phase detection is over, the output pulse generator will generate one output pulse and one corresponding feedback pulse, OUTPLSFB, each EOC cycle until the lower decade counter reaches the rest condition of count nine, PDR 9/90. During medium and high range operation, each feedback pulse ($\overline{OUTPLSFB}$ goes to logic 0) advances the lower decade counter by one count. During these ranges, the upper decade counter recycles in response to each feedback pulse and has no control over the generation of output pulses. Gate 238 will initially be blocked by the low condition of $\overline{PDR9}$. The feedback pulse passes through gates 236, 234 and 232 to advance the lower decade by one count. The pulse output of gate 236 also advances the upper decade one count to a count of zero. The blocking condition of gate 238 is removed and this gate applies $\overline{C_2}$ clock pulses to gate 236 and the upper decade counter. The upper decade counter will count the $\overline{C_2}$ clock pulses until it reaches a count of nine again. At that time, gate 238 will again be blocked by the low condition of $\overline{PDR9}$. The $\overline{C_2}$ clock pulses have no effect on the lower decade because gate 234 is blocked as long as the upper decade is not registering a count of nine.

As will be explained below in connection with speed shifting circuitry of FIG. 6, when switching from medium range to low range, a low range permit flip-flop is set prior to setting a low range flip-flop. Referring to FIG. 2 and feedback gate 238, this means that $\overline{LRPRMT}$ goes to logic 0 shortly before entering into low range operation. With $\overline{LRPRMT}$ at logic 0, gage 238 is blocked and the next feedback pulse places the upper decade at a count of zero. The zero count of the upper decade serves as the rest position of the upper decade during low range operation.

The next phase difference detection will cycle the lower decade counter from nine to eight with the upper decade remaining at zero. Now, in this condition, the phase difference register must receive ten feedback pulses before advancing the lower decade to PDR 9/90. The first eight feedback pulses will be counted by the upper decade but will not pass through gate 234. In response to the ninth feedback pulse the upper decade counter will advance to the count of nine and will place gate 234 in the ready condition. The tenth feedback pulse will cycle the upper counter to the count of zero and will also cycle the lower counter to the rest condition PDR 9/90. The pulse generator output pulses correspond to the feedback pulses and therefore the output pulses will be increased tenfold during low range operation by the circuitry described above.

Figure 4:
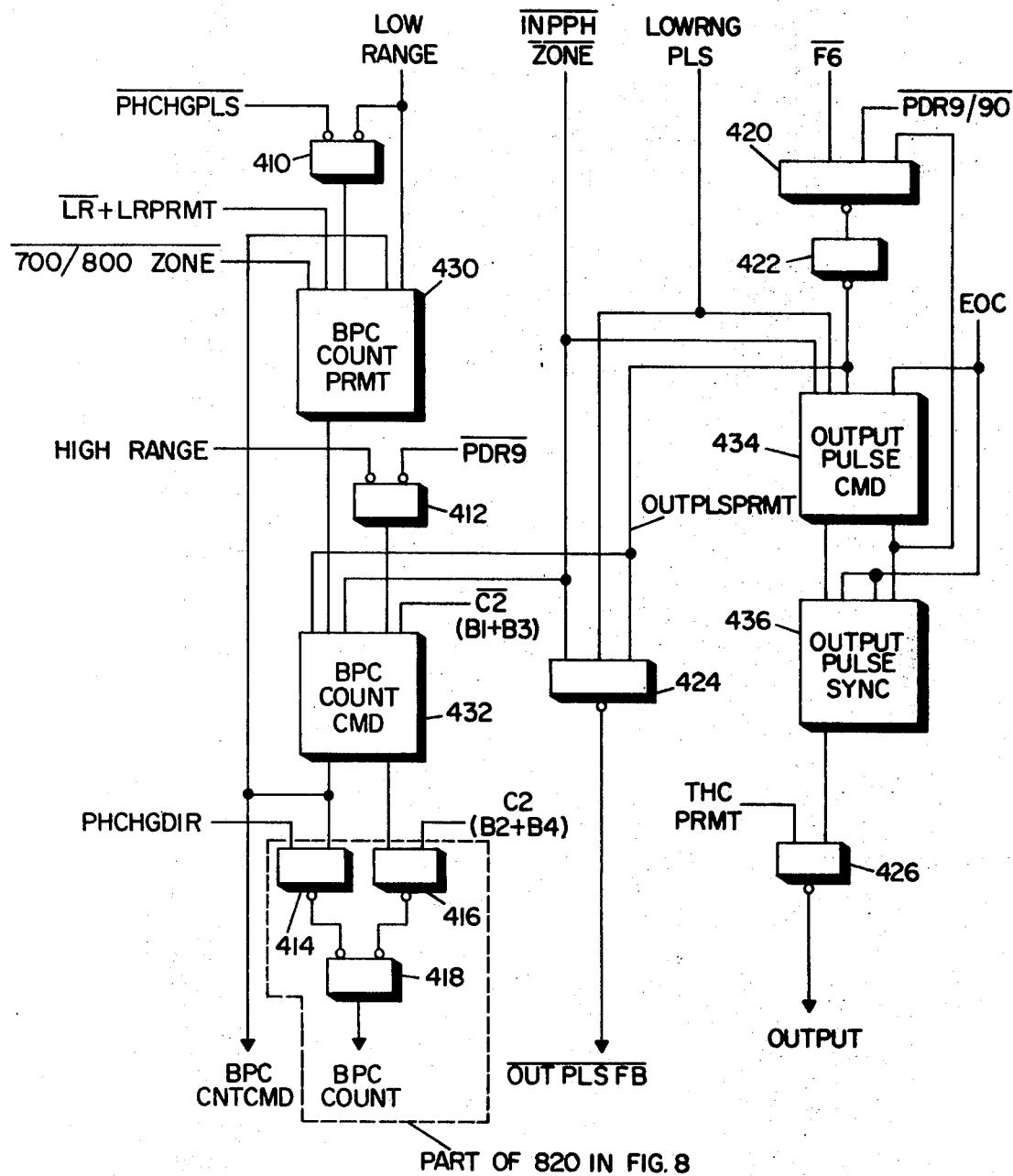
FIG. 4 is a detailed logic diagram of apparatus for generating output pulses and feedback pulses and for updating the phase of the reference waveform.
Figure 4A:
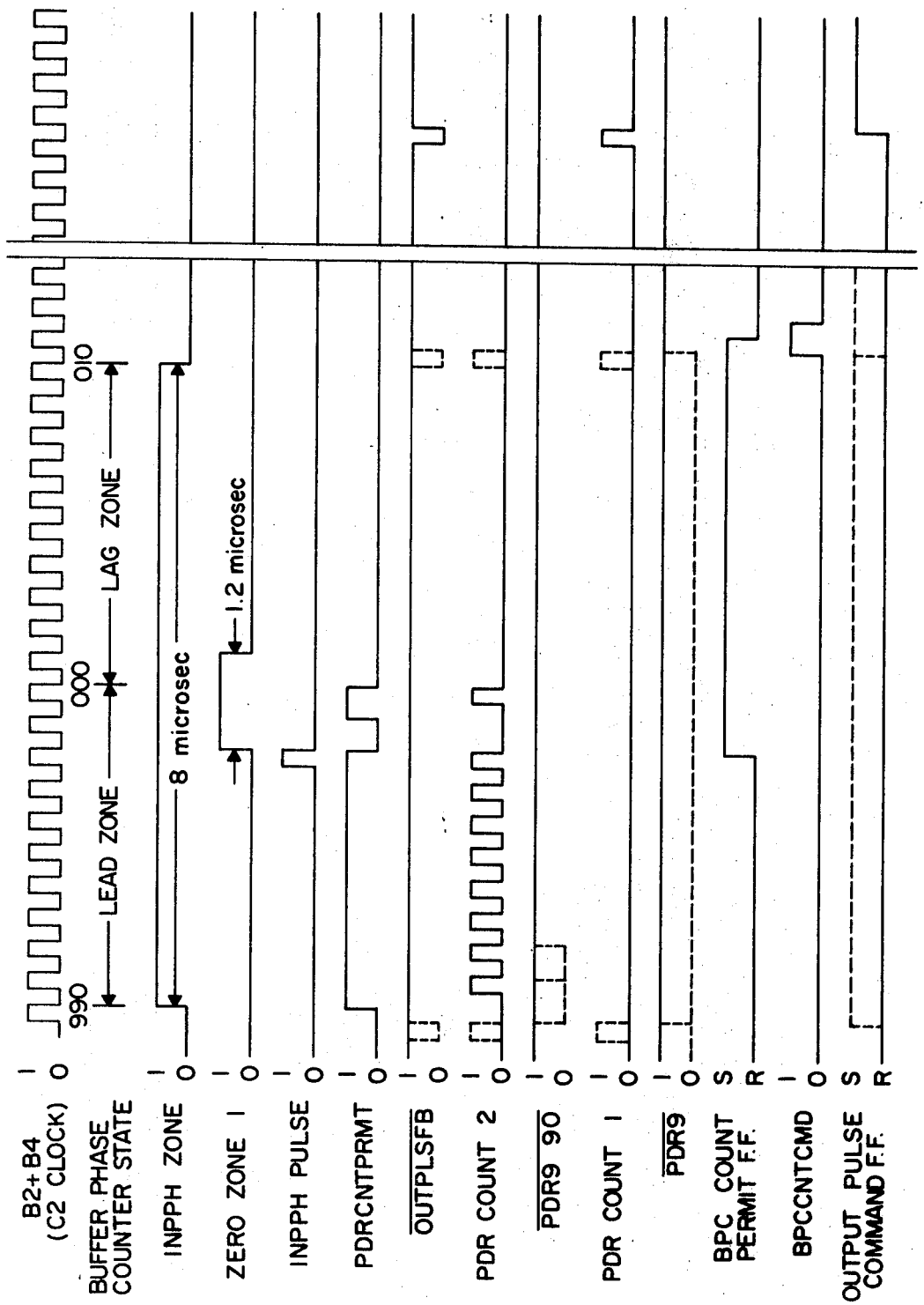
FIGS. 4a, 4b and 4c are pulse waveforms illustrating logic signals which are developed by and occur at various identified points in the detailed logic diagrams of FIGS. 1, 2, 3, and 4.
Figure 4B:
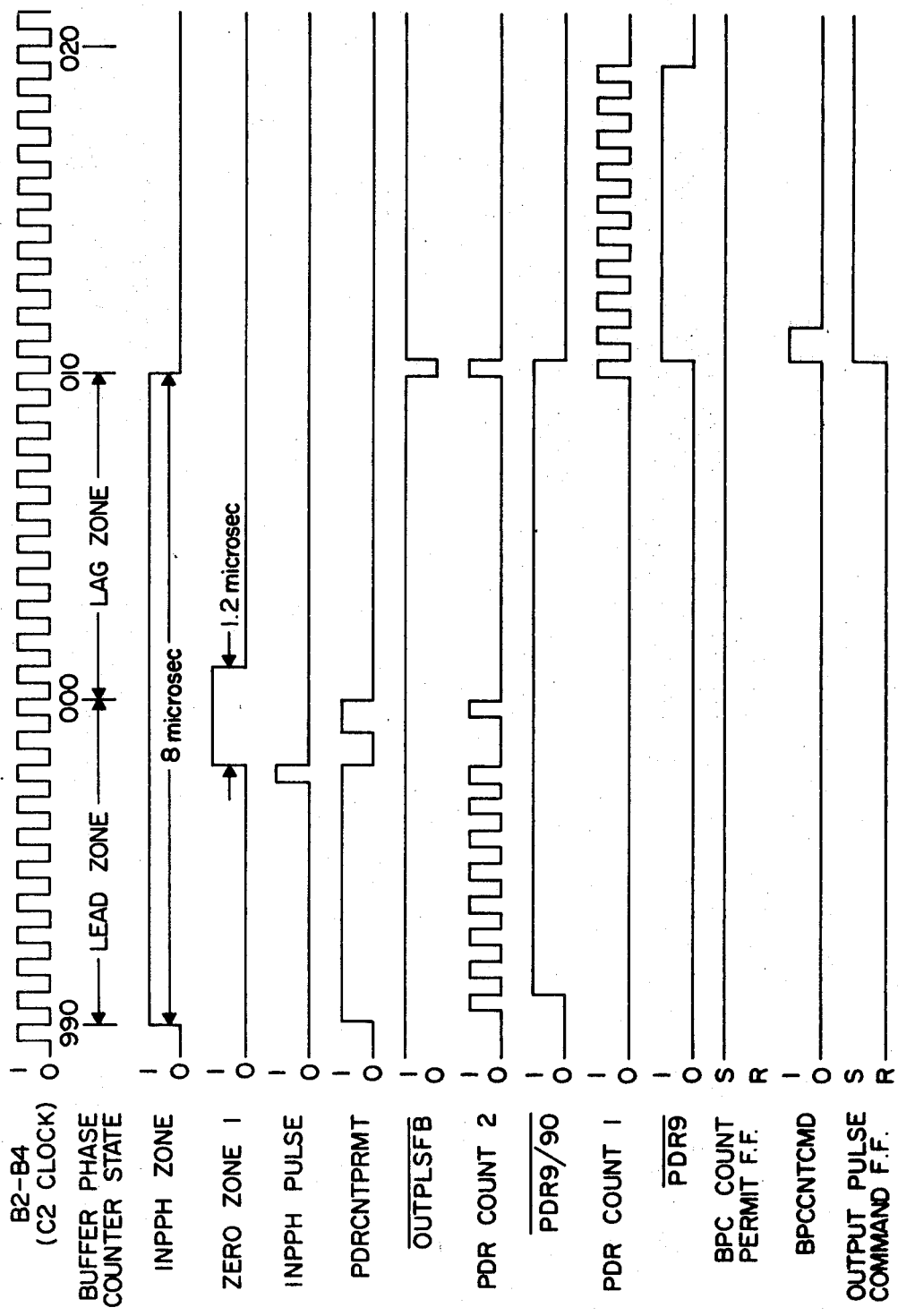
Figure 4C:
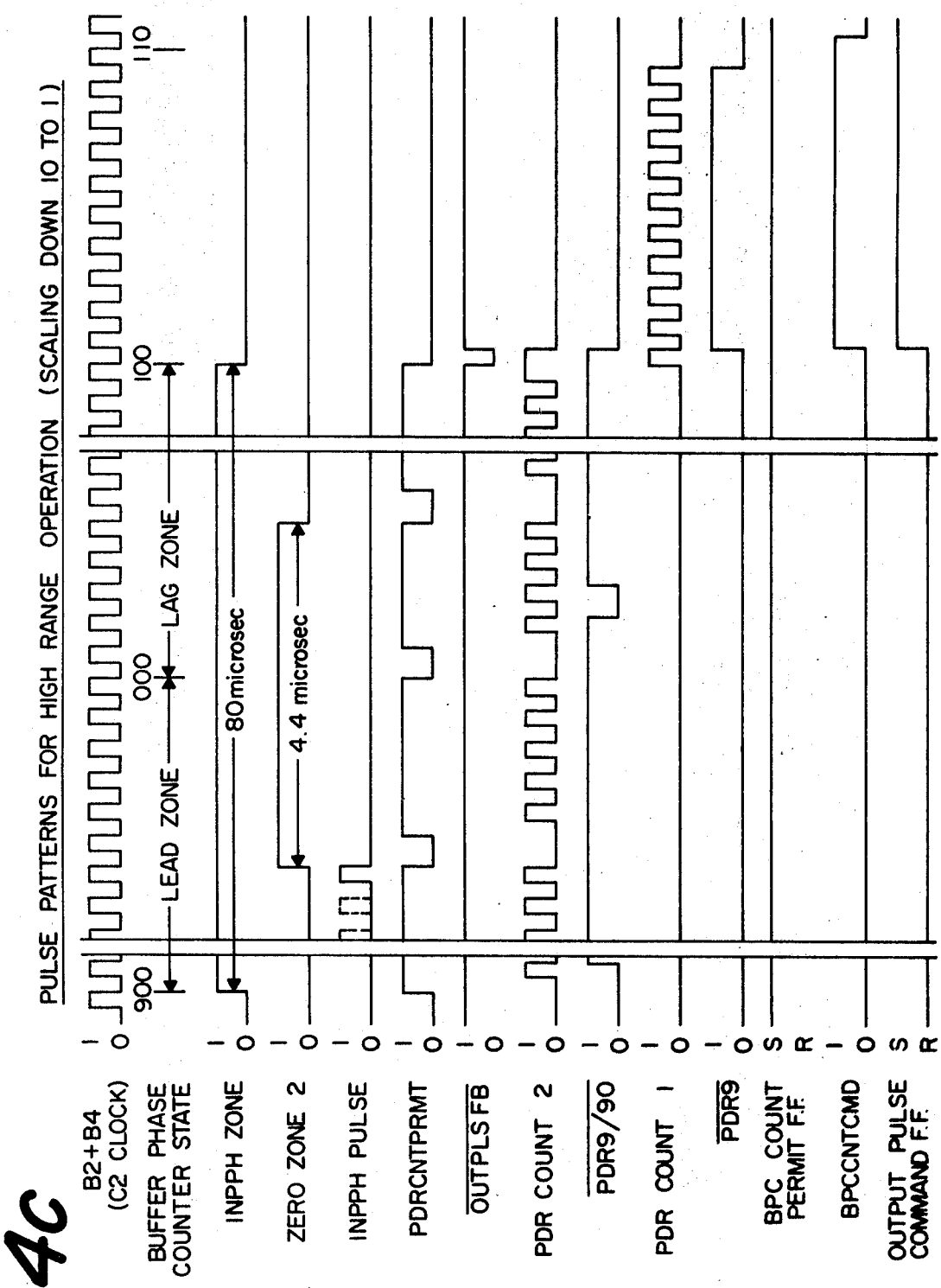

The pulse patterns described above for low, medium, and high range operation are illustrated respectively in FIGS. 4a, 4b, and 4c.

The output pulse generation and feedback circuit is illustrated in FIG. 4. The output pulses correspond to the logic 0 state of $\overline{\text{OUTPUT}}$, the output line from gate 426. The output pulses, for the specific logic shown, last an entire circulation cycle (60 $\mu$sec.) and are nonreturn to zero, i.e., two consecutive output pulses appear as a single 120 usec gate signal. It will be apparent that the output pulses as generated could simply be converted into short pulse signals by using the output of gate 426 to gate a short pulse timing signal which occurs once each circulation cycle. It should also be noted that a THC PRMT signal must be at logic 1 to generate output pulses. This feature, although shown herein in the specific example of threadcutting, would not be necessary if threadcutting is not being performed. The output pulses, of course, would only control the velocity of threading if the invention described herein is used in connection with a threadcutting system. The output pulse generation feedback circuit performs three basic functions. It provides output pulses having a frequency related to the motor velocity. It provides feedback pulses, $\overline{\text{OUTPLSFB}}$, to meter out the phase difference quantity held in the phase difference register (FIG. 2). It also provides BPC count pulses for maintaining the reference waveform and for updating the phase of the reference waveform following the phase difference measurement. The latter three output function, which are represented by output pulses, have different frequencies depending upon whether the system is at low range, medium range, or high range operation. The medium range operation will be initially discussed. For a threadcutting operation a THC permit signal will be present and thus an output pulse will be generated each time the output pulse sync flip-flop 436 goes from a reset to a set condition. The EOC input to the latter flip-flop ensures that the output pulse sync flip-flop 436 will not change states more than once for each EOC pulse. This ensures that a maximum of one output pulse per circulation cycle can be generated. As a specific example, a typical circulation cycle for a numerical control system may be 60 $\mu$sec. Each EOC pulse also resets an output pulse command flip-flop 434 whose set and reset outputs are tied to the set and reset inputs of the output pulse sync flip-flop 436. For the purpose of explaining the operation of the circuit of FIG. 4, it may be assumed that the output pulse command flip-flop and the output pulse sync flip-flop are in the reset condition initially. The three steering inputs to the set side of the flip-flop 434 are $\overline{\text{INPPH ZONE}}$, LOWRNG PLS and the output of gate 422. The steering signal $\overline{\text{INPPH ZONE}}$ ensures that flip-flop 434 is not set until after the end of the interphase zone. The signal LOWRNG PLS serves a purpose only during low range operation, as will be later explained, and is a logic 1 continuously at medium and high range. The output of gate 422 will be at logic 1 provided flip-flop 434 is in the reset condition, the phase difference counter is not at the rest condition of PDR 9/90 and it is not time F6. Thus, for normal operation, as soon as the interphase zone is over, and provided a phase difference has been detected, flip-flop 434 will be set and will remain set until the next arriving EOC pulse. The same EOC pulse will set the flip-flop 436 which will remain set for an entire circulation cycle. The steering inputs to the set side of flip-flop 434 are also applied to a feedback pulse gate 424. Thus, the above-described condition also generates feedback pulses. The feedback pulses are short pulses because when flip-flop 434 is set the output of gate 422 goes low causing termination of the pulse output from gate 424. As described above in connection with FIG. 2, the feedback pulse causes the lower decade counter to advance 1 count. If the prior single feedback pulse applied to the phase difference register has not advanced the phase difference register to the count of nine rest condition, a new feedback pulse and a new output pulse will be generated in the same manner as described above. On the other hand, if the phase difference register has reached the count of nine rest condition, no further feedback pulses and no further output pulses will be generated. Consequently, it can be seen that for medium range operation the number of output pulses generated and the number of feedback pulses generated ($\overline{\text{OUTPLSFB}}$) is equal to the phase lead or phase lag detected during the prior interphase zone.

Assuming that there is a detected phase lead of 2 counts, it will be apparent that the buffer phase counter must also be updated by two counts in order to be effectively placed in synchronism with the input phase pulse. The need for placing the buffer phase counter is synchronism with the input phase count pulse is to allow each subsequent phase difference measurement to be a measurement or rotational velocity. The BPC count is controlled by the BPC count command flip-flop 432 of FIG. 4. During the normal condition, the BPC count command flip-flop is in the reset condition and the $C_2$ clock pulses are passed through gates 416 and 418 to the BPC count input. (Note that the $C_2$ clock signal shown here corresponds to the $C_2$ clock shown entering block 820 of FIG. 8.) With the exception of the LOWRNG PLS input and the addition of an output from BPC count permit flip-flop 430, the same conditions causing generation of a feedback pulse also sets the BPC count command flip-flop 432. Flip-flop 432 will remain set for only one $C_2$ clock period, unless $\overline{\text{PDR9}}$ is at logic 1 as it is during high range operation. When set, flip-flop 432 in conjunction with gates 414 and 418 causes the buffer phase counter to be advanced one count or retarded one count. If PHCHGDIR is logic 1, indicating a phase lead, the BPC count input to the buffer phase counter will remain at logic 1 for an entire $C_2$ clock period thereby causing the counter to count at the $C_1$ rate for a single $C_2$ clock period, i.e., counts by two. This advances the phase of the BPC reference waveform. For a phase lag, PHCHGDIR will be a logic 0, thereby causing BPC count to be at a logic 0 for a full $C_2$ clock period. The buffer phase counter will thus skip a count and retard the phase of the BPC reference waveform.

For low range operation, as pointed out above, the output pulses and feedback pulses occur at a ratio of ten for every one unit of phase difference detected. The BPC count permit flip-flop 430 will be in the reset condition and will be set by phase change pulses ($\overline{\text{PHCHGPLS}}$= logic 0), which, as will be described hereafter, are generated in response to a phase difference detection. Thus the steering input to flip-flop 432 coming from flip-flop 430 will only be high for a short time in response to each phase difference detected, and the BPC counter will only be advanced or retarded one count for each phase difference detected, not ten counts.

For high range operation, each output pulse and feedback pulse represents 10 units ($C_2$ clock times) of phase difference and therefore it is necessary to update the buffer phase counter by 10 counts for each output pulse generated. This is accomplished by gate 412. When flip-flop 432 is set it will now remain set until the upper decade counter of the phase difference register (FIG. 2) reaches a count of nine (signal $\overline{\text{PDR9}}$ = logic 0). This takes 10 $C_2$ clock times and therefore the buffer phase counter will either block 10 counts or add 10 counts depending upon the logical state of PHCHGDIR.

As mentioned above, the input LOWRNG PLS controls operation during low range; it is logic 1 continuously for medium and high range. The generation of LOWRNG PLS will be explained below, but for the purpose of understanding its control function, it is sufficient to recognize that during low range operation, the LOWRNG PLS input is a series of positive pulses having a frequency which results in the generation of 10 pulses evenly spaced between each phase difference detection. During low range, the phase difference detection will typically occur many excitation cycles (400 $\mu$sec.) apart and therefore the low range pulses (LOWRNG PLS) will have a rate substantially less than the EOC rate. By applying the low range pulses to the flip-flop 434 and the gate 424 the output and feedback pulses are caused to have an output rate corresponding to the low range pulses.

Figure 5:
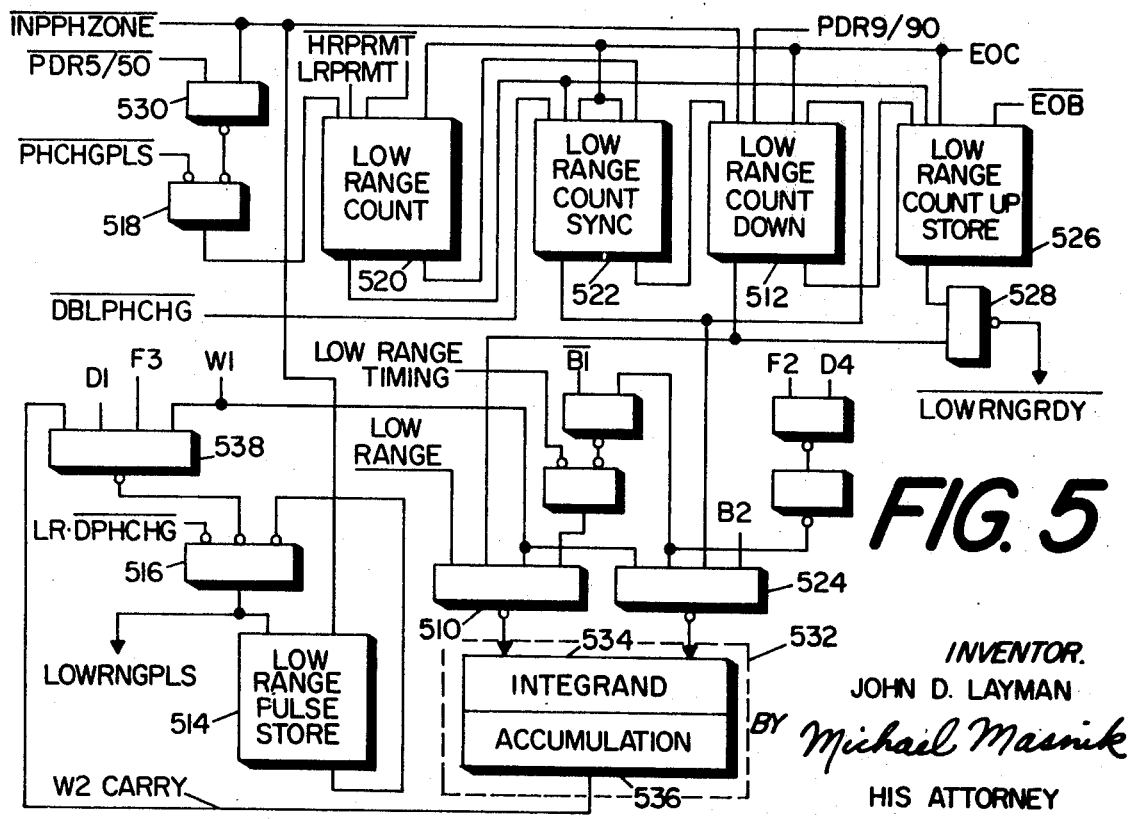
FIG. 5 is a detailed logic diagram of apparatus for substantially evenly spreading the output pulses between phase difference detections while the spindle motor is operating at low speeds.

The low range X10 pulse multiplier 838 (FIG. 5) is only used during the low range operation of the pulse generator. During low range operation, the motor 818 is operating at a relatively low number of revolutions per minute and, therefore, phase changes will occur very slowly. Also during the low range operation the phase detection circuitry detects only a phase change of a single unit during any interphase zone. This is because the r.p.m.'s of the motor are so low that a phase change of two units will never occur during any single interphase zone. For each phase change detected, the pulse generator provides 10 output pulses and ten feedback pulses. The object of the times 10 multiplier which is shown in detail in FIG. 5, is to evenly spread the aforementioned 10 output pulses over the period between detected phase changes. The rate of the output pulses is controlled by the rate of the LOWRNG PLS signals appearing at the output of gate 516 in FIG. 5. The rate of pulses at the output of gate 516 is, in turn, controlled by the rate of the $W_2$ CARRY pulses applied at the input of gate 538. The $W_2$ CARRY pulses are generated by an arithmetic unit 532 which may be, and preferably is, a part of the standard numerical control system with which the present invention is associated. The functional operation of the arithmetic unit 532 is indicated by the integrand 534 and the accumulator 536. In operation, the integrand 534 stores a numerical value which is periodically entered into and accumulated by the accumulator 536. The accumulator 536 has a maximum capacity and produces a $W_2$ CARRY output (or overflow) pulse when the maximum capacity is reached. The rate of the $W_2$ CARRY output pulses may be increased by increasing the integrand or it may be decreased by decreasing the value of the integrand. The circuit of FIG. 5 operates to increase or decrease the integrand depending upon the even spread of the 10 output pulses over the entire period between phase change detections. In FIG. 5, and in other figures, the signals indicated by the labels B, W, D, and F, are all timing signals and are all related to the clock $C_1$ as indicated in FIG. 9. It will also be noted that there are six F times to each circulation. These timing signals may be generated in a conventional manner by apparatus well known in the art.

A low output from gate 524 commands the arithmetic unit 532 to make an incremental change in the value of the integrand, and the sense of the output from gate 510 controls the direction of said incremental change. The output of gate 524 goes low at time $W_1F_2D_4B_2$ provided that the low range count sync flip-flop 522 is in the set condition. The output from gate 510 will go low at time $F_2D_4W_1(B_2+_{B3}+B_4)$ provided low range countdown flip-flop 512 is in the set condition. If the latter conditions occur, the integrand 534 will be decreased an incremental amount thereby resulting in a unit decrease in the frequency of the $W_2$ CARRY pulses and a corresponding decrease in the frequency of the LOWRNG PLS pulses from gate 516.

The flip-flops 522 and 512, along with flip-flop 520 operate as follows. Each time a phase change is detected, the input PHCHGPLS goes down resulting in a high output from gate 518 which sets the low range count flip-flop 520. The flip-flop 520 remains set until the end of the circulation cycle. When flip-flop 520 is in the set condition, the following EOC pulse will set the low range count sync flip-flop 522. This latter flip-flop will remain set for the entire circulation cycle and will be reset by the next occurring EOC pulse. Consequently, for each detected phase change the flip-flop 522 will be set for an entire circulation cycle. It will be noted that the set output of flip-flop 522, as indicated above, results in a low output from gate 524 thereby commanding an incremental change of the integrand value in the integrand register 534. The low range countdown flip-flop 512 operates to compare the time of occurrence of the 10th pulse metered out from the pulse generator with the detected phase change pulses. Since, during low range operation, only a single unit of phase change is detected in response to each phase change detection, the phase difference register of FIG. 2 will be cycled to a count of eight in response to each phase change detection and will advance to a count of nine (indicated by the signal PDR 9/90) when all 10 pulses have been metered out of the pulse generator. Thus, when the signal PDR 9/90 is at logic 1, that indicates that all 10 pulses have been metered out. If PDR 9/90 is at logic 1 when flip-flop 522 is set this means that the pulse output rate is too low. The low range countdown flip-flop 512 remains reset resulting in a condition which causes a decrease in the value stored in the integrand register 534. On the other hand, if the low range count sync flip-flop 522 is in the reset condition when PDR 9/90 goes to logic 1, this means that the output pulse rate is too high. The low range countdown flip-flop is set resulting in an output condition which decreases the value stored in the integrand register 534.

The low range countup store flip-flop 526 in combination with gate 528 operates to provide a low range ready output pulse from gate 528 indicating that low range operation is ready. The latter output pulse occurs when the pulse rate from the pulse generator, as detected by the low range X10 pulse multiplier, is at a frequency such that the 10 pulses are evenly spread over the period between phase changes. If the frequency is substantially correct, the direction of change of the integrand, as commanded by gates 524 and 510 in response to the condition of flip-flops 522 and 512 will generally be reversed each detected phase change. When this reversal occurs, a coincidence between the set conditions of flip-flops 512 and 526 will also occur thereby resulting in a low range ready output signals.

The function of gate 530 is to rapidly increase the $W_2$ CARRY pulse rate when the detected phase change pulses occur too rapidly with respect to the output pulse rate. As mentioned above, during the low range operation, a single unit of phase change is detected for each phase change detection. Consequently, and also because the phase difference register receives the 10's complement of the detected phase change, the phase difference register should register a count of eight or nine when outside of the interphase zone time period. However, if a subsequent phase change is detected before the 10 pulses have been metered out, the phase difference register will go to a count of seven. If this condition continues, the phase difference register will eventually go to a count of five or less, at which time the signal $\overline{\text{PDR 5/50}}$ will go high outside of the interphase zone. For as long as this condition occurs, the output of gate 530 will remain low and the low range count flip-flop 520 will be set once each circulation cycle. Furthermore, the low range count sync flip-flop 522 will then set and remain in the set condition. This condition results in a rapid increase of the $W_2$ CARRY pulse frequency which, in turn, results in a rapid increase of the output pulse frequency until the high condition of $\overline{\text{PDR 5/50}}$ is removed.

The speed range control circuit 836 (FIG. 8) is shown in detail in FIG. 6. It operates a monitor signals which are indicative of the rotational speed of the motor and to shift the pulse generator to either low, medium, or high range operation. The control signals generated by the speed range control circuitry of FIG. 6 are shown at the lower portion of the drawing. The control signals depend upon the states of five flip-flop elements. The five flip-flop elements are the double phase change flip-flop 676, the low range permit flip-flop 670, the low range flip-flop 674, the high range permit flip-flop 618, and the high range flip-flop 620. It will be noted that there is neither a medium range permit flip-flop nor a medium range flip-flop. Medium range control signals are generated in the absence of a set condition on both the low range flip-flop 674 and high range flip-flop 620 by means of the logic gates 660 and 662. The purpose of the permit flip-flops 670 and 618 is to provide smooth transition between ranges.

As shown at the upper left corner of FIG. 6, the gates 610, 612, 614, and 616 operate to generate zero pulses and phase change pulses (PHCHGPLS) representing respectively no phase change and a detected phase change. As will be remembered from the discussion above, an input phase pulse is generated each excitation cycle (400 microseconds). If the input phase pulse occurs outside of the zero zone, then a phase change pulse will be generated indicating a phase change during the excitation cycle. On the other hand, if the input phase pulse occurs in coincidence with the zero zone, then a zero pulse will be generated from gate 616. During low and medium range operation gate 610 and the zero zone 1 input, generated as shown in FIG. 1, controls generation of the zero pulses. During high range, when the high range permit flip-flop 618 or the high range flip-flop 620 is set, the gate 612 and the zero zone 2 input controls the generation of the zero pulses. The zero zone 2 control signal is generated by the zero zone 2 flip-flop shown in FIG. 3. It will be noted from FIG. 3a that zero zone 1 covers BPC 998 through BPC 000 whereas zero zone 2 covers BPC 994 through BPC 004. Thus, the width of the zero phase zone is substantially wider during high range operation. The zero or no phase change pulses are shifted into the shift register 668 by means of the clock $C_1$ and the shifting input signal $\overline{\text{INPPH PULSE}}$. When the latter control signal goes low, the contents of all four stages of the shift register are shifted to the right and the signal at the output of gate 616 is shifted into stage one. The shift register 668 thus keeps track of the consecutive phase changes or consecutive zero phase changes occurring during the consecutive excitation cycles.

In describing the manner in which the circuitry of FIG. 6 operates to change from low to medium or from medium to high, etc., it will initially be assumed that the forcing signals $\overline{\text{LRFORCE}}$, $\overline{\text{MRFORCE}}$, and $\overline{\text{HRFORCE}}$, are all at logic 1. The generation of the latter signals will be described in more detail in connection with FIG. 7. Assuming the system is presently operating at medium range, the low range permit flip-flop 670, the low range flip-flop 674, the high range permit flip-flop 618 and the high range flip-flop 620 will be in the reset condition resulting in a medium range output from gate 662. A shift from medium to low occurs as follows. The system operates to detect three consecutive excitation cycles. The detection of three such zero pulses indicates that the motor is rotating at 50 r.p.m. or lower. The first two consecutive zero pulses result in stages 1 and 2 of shift register 668 being set. This condition is ANDed by gate 622 resulting in a first steering signal being applied to the set input of the low range permit flip-flop 670. A second steering signal to the set input of flip-flop 670 is from the reset output of the high range flip-flop 620. The third steering signal is the zero pulse from gate 616. Thus, three zero pulses in a row will result in the setting of flip-flop 670. When the latter occurs, the signal LRPRMT provides a first steering input to the flip-flop 674. (It may be recalled that a zero count rest position is established at this time for the upper decade of the counter explained above in connection with the phase difference register of FIG. 2.) The low range flip-flop 674 will be set during the 700/800 zone occurring after the next phase change. The phase change steering signal is applied from the output of gate 646 whose input is connected to the set output of stage 1 of the shift register 668.

The control will change back to medium range from the low range condition upon detection of two consecutive phase changes. The detection of two consecutive phase changes indicates that the motor is about 75 r.p.m. Two consecutive phase changes result in the setting of the double phase change flip-flop 676 is applied through gates 636 and 638 to provide a first steering condition for the reset input of flip-flop 670. The latter flip-flop will be reset in response to the occurrence of the next zero pulse from gate 616. The low range flip-flop 674 will be reset during the 700/800 zone occurring three excitation cycles later. (This allows time for completion of all X10 pulses yet to be generated.)

The system will switch from medium range to high range if any given phase difference detection results in a phase difference of five or more units (i.e., five or more $C_2$ clock periods). A phase difference of this magnitude indicates that the motor is operating at the rate of 750 r.p.m. or above. The manner in which a five unit phase difference is detected involves the BPC count command signal applied to gate 630 and the 700/800 zone signal. As will be recalled from the above discussion in connection with FIG. 4, a BPC count command signal is at logic 1 when the BPC is to be updated. The BPC count command signal remains at logic 0 after all pulses have been metered out (i.e., PDR 9/90 = logic 1). If a phase difference of five or more units has been detected, the BPC count command signal goes to logic 1 condition at least once during the 700/800 zone of the excitation cycle. It is this latter coincidence which allows detection of the high rate of revolutions per minute and which causes the system to switch to high range. Thus, if the BPC count command is high at any time during which the 700/800 zone occurs, all of the steering conditions necessary to set the high range permit flip-flop 618 will be present and therefore the latter flip-flop will be placed in the set condition. The high range flip-flop 620 will be set during the following excitation cycle during the time 400/500 of the BPC.

It will be noted that during the set condition of either flip-flops 618 or 620 the gates 642 and 644 cooperate to prevent either of the flip-flops 670 or 674 from being placed in the set condition.

Figure 6A:
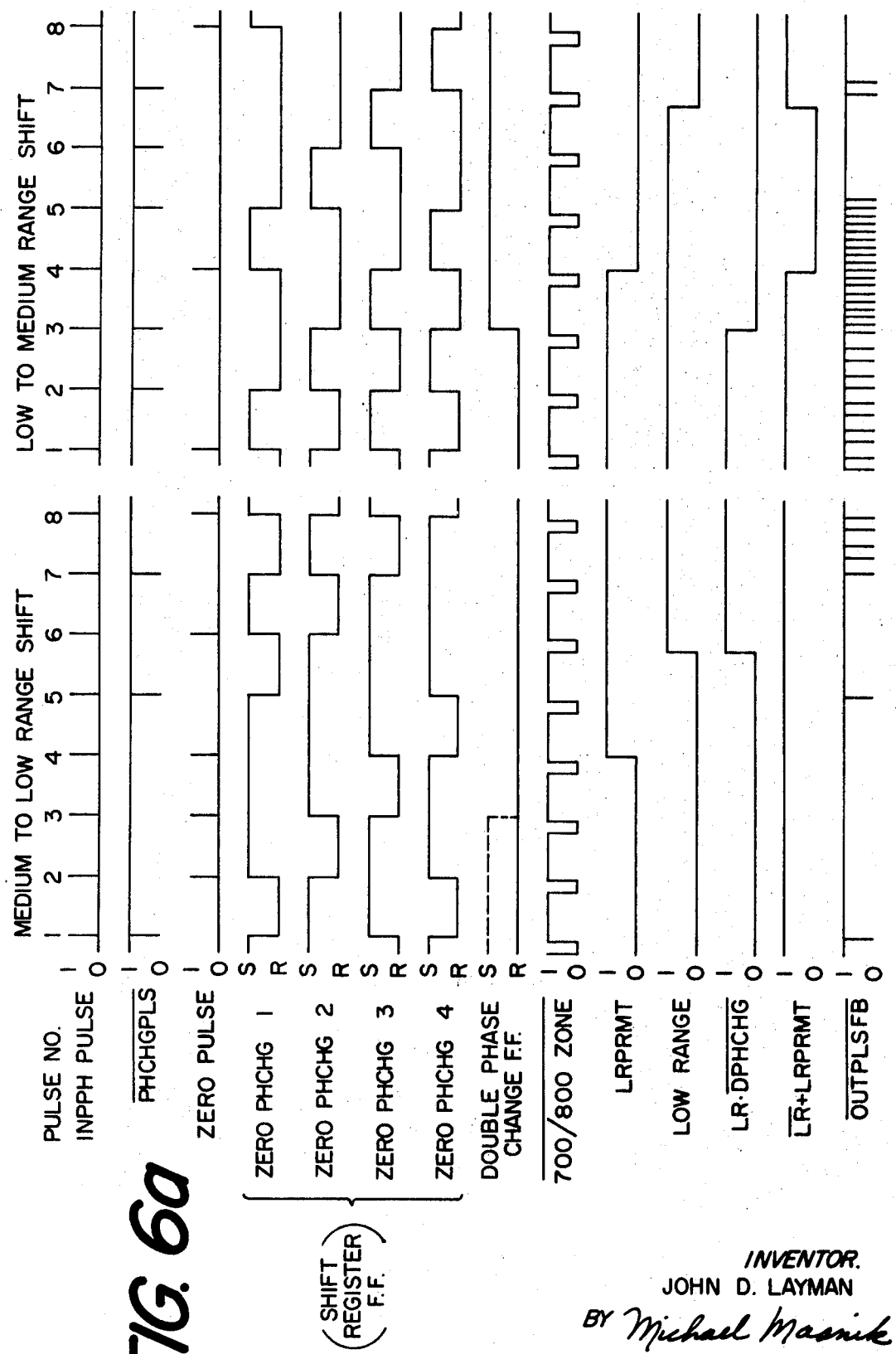
FIGS. 6a and 6b are pulse waveforms illustrating logic signals which are developed by and occur at various identified points in the detailed logic diagrams of FIG. 6.
Figure 6B:
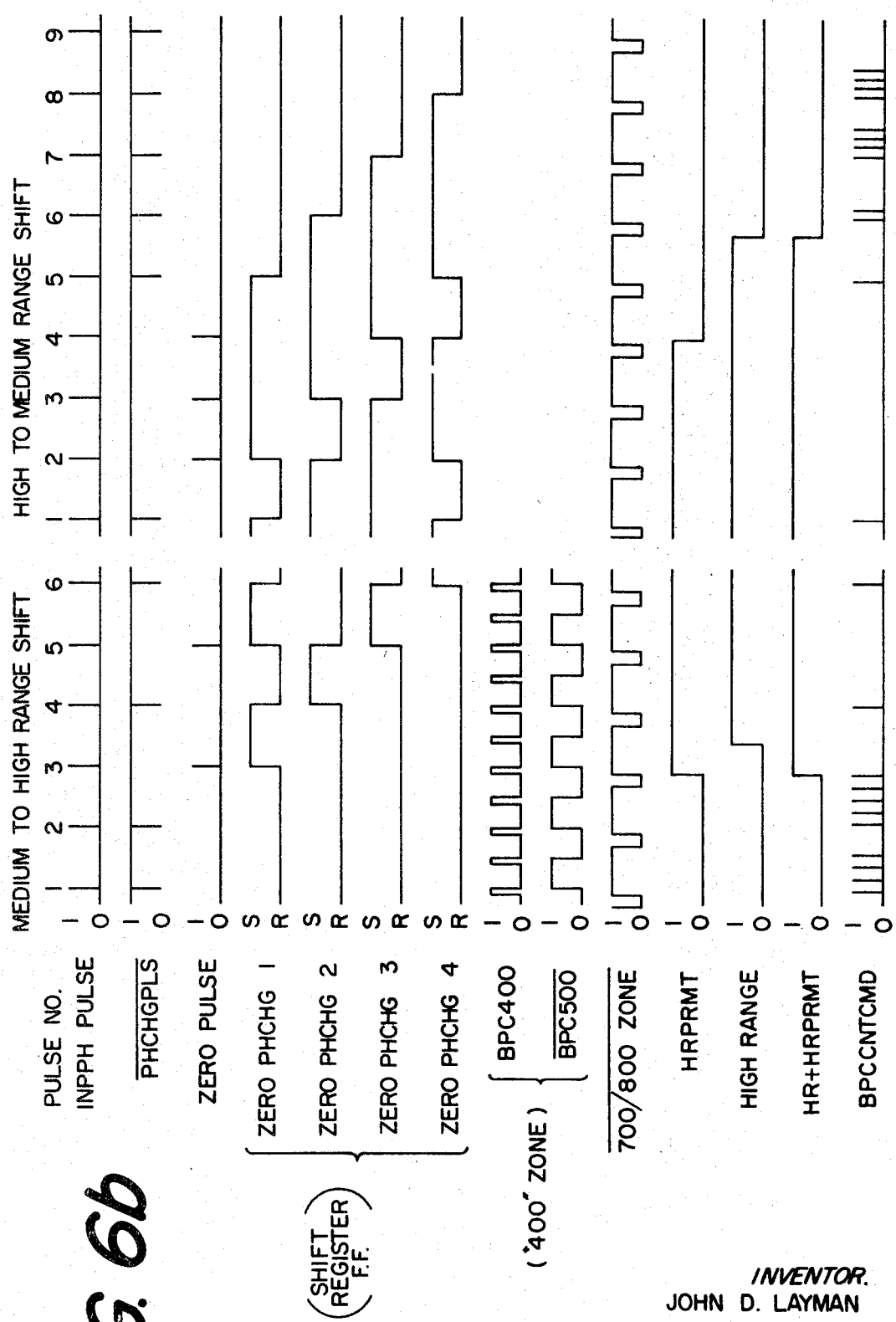

The control switches from high range to medium range in the same manner that it switches from medium range to low range as described above. That is, a change from high range to medium range occurs in response to the detection of three consecutive zero pulses. It will be noted that when operating at high range, the measurement scales are changed by a factor of ten and therefore three consecutive zero pulses indicate that the motor is at 500 r.p.m. or below rather than at 50 r.p.m. or below. Two consecutive zero pulses are detected by coincidence of the set condition of stages 1 and 2 of shift register 668. The latter condition results in a first reset steering condition to flip-flop 618 via gates 622 and 634. The second steering condition necessary to reset flip-flop 618 is provided by the output of gate 616. When reset, flip-flop 618 provides a first steering condition to the reset side of the high range flip-flop 620. The latter flip-flop will be reset during the 700/800 zone of the next excitation cycle in which a phase change occurs. Note the phase change indication output from gate 646 is applied as one of the steering conditions to the reset side of the flip-flop 620. FIGS. 6a and 6b show the timing of the various flip-flops and other pulses generated in the circuitry of FIG. 6 in accordance with the above description.

The speed range control circuit, shown in detail in FIG. 6, also has low range, medium range, and high range forcing signals. The latter forcing signals force the range control circuitry to generate the low range, medium range, and high range control signals respectively. The forcing signals are generated in response to a program condition being applied to the prior art numerical control system with which the present invention is associated. The purpose of the forcing signals is to force the pulse generator of the present invention into certain ranges in response to desired conditions.

Figure 7:
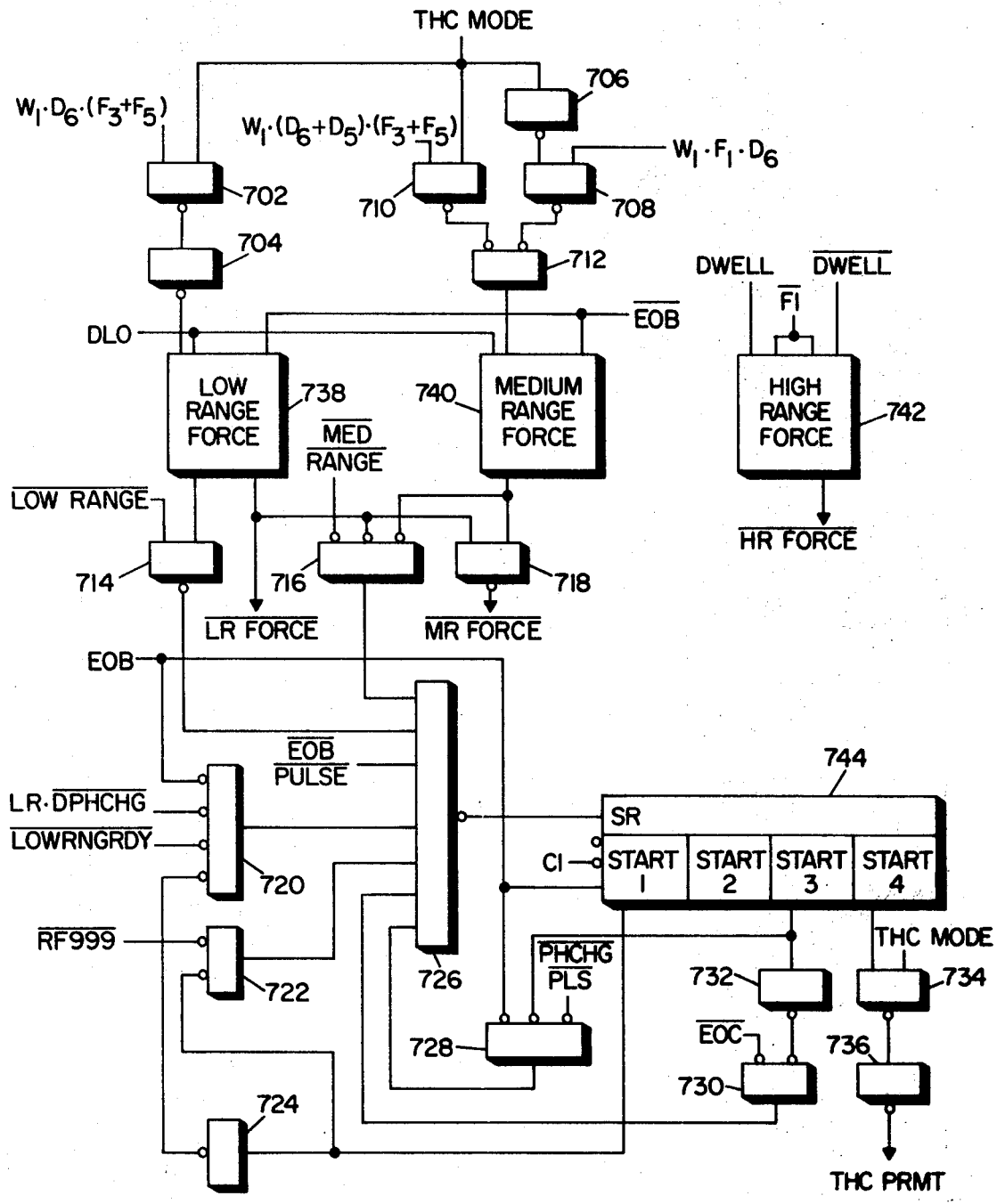
FIG. 7 is a detailed logic diagram of apparatus for forcing certain ranges of operation and apparatus for ensuring that velocity pulses for use in threadcutting are not started until the spindle motor reaches a certain indexed position.

The forcing signals are generated by the circuitry shown in FIG. 7. High range forcing is controlled by flip-flop 742 which is responsive to a DWELL signal which is an input identifying that the numerical control system is presently in a DWELL condition. As is well known in the threadcutting numerical control art, a DWELL condition is programmed by a G04 code in the well-known G register of the numerical control system. However, for the purpose of the present invention, it is sufficient to understand that a signal, referred to as DWELL, is generated indicating a DWELL condition. The latter signal results in the setting of flip-flop 742 which, in turn, forces the speed range control circuit into high range. It will be noted that when in high range the pulse generator supplies the minimum number of pulses to the numerical control system.

Medium range forcing occurs when the output of gate 718 is low. This, in turn, occurs when the medium range force flip-flop 740 is in the set condition and the low range force flip-flop 738 is in the reset condition. Low range forcing occurs whenever the low range force flip-flop 738 is in the set condition. The low range force flip-flop 738 and the medium range force flip-flop 740 are set in response to a programmed signal indicating a specified number of inches per revolution. As will be well understood by anyone having ordinary skill in the art to which the invention pertains, a numerical control system for use in a threadcutting or other inches per revolution operations, receives programming instructions identifying the programmed lead or inches per revolution. In one type of numerical control system the programmed information is stored by means of a delay line, and the proper information is read out of the delay line by examining the delay line output at specified time intervals. The logic inputs shown in the upper portion of FIG. 7 provide timing signals for examining the delay line output, DLO, at proper times. For the specific example described herein, low range forcing will occur whenever the programmed lead or inches per revolution is greater than 0.1 inch but less than 1 inch. The latter programmed conditions are indicated by the signal on line DLO at the proper times as controlled by the logic circuitry. It will be noted that the low range forcing flip-flop 738 can be set only for the threadcutting mode. The threadcutting mode is indicated by a threadcutting mode input applied to gates 702, 710, and 706. The absence of a THC MODE input indicates an inches per revolution mode. During the threadcutting mode at time $W_1 \cdot D_6 \cdot (F_3 + F_5)$ the condition on line DLO is examined. If the latter signal is high, then the low range flip-flop 738 will be set. For threadcutting mode operation, the medium range force flip-flop 740 will be set if DLO is high at time $W_1(D_6+D_5)(F_3+F_5)$. For inches per revolution mode ($\overline{THC\ MODE}$) the medium range force flip-flop 740 will be set if the signal on DLO is high at time $W_1 \cdot F_6 \cdot D_6$. Both the low range force flip-flop and the medium range force flip-flip are reset by a signal $\overline{EOB}$. The latter signal is a control signal which comes from the numerical control system and which relates to the condition of reading or not reading the programmed data. The control signal $\overline{EOB}$ is a logic 1 when the numerical control system is not reading data; the control signal EOB is a logic 1 when the control system is reading data; the control signal $\overline{EOB\ PULSE}$ is a control signal which is a logic 1 only for a very short time just after the system finishes reading a block of data; and the control signal EOB PULSE is a logic 1 except for a very short time just after the system finishes reading a block of data. The data is the programmed input to the numerical control system which is conventionally entered into that system in block form. The symbol EOB stands for end-of-block.

The remainder of the logic shown in FIG. 7 is the threadcutting index circuit 834 (FIG. 8). This circuit is used during the threadcutting mode for the purpose of ensuring that the motor is at a proper reference starting position before threadcutting pulses are generated. This system operates to provide the output THCPRMT (threadcutting permit) which is needed to permit output pulses from the pulse generator during the threadcutting operation. Not shown in the drawing, but included within the system, is a reference frequency counter, RF, which is substantially the same as the buffer counter described above except that the reference frequency counter is not updated. The reference frequency counter counts from RF 000 to RF 999 in response to $C_2$ clock pulses. The RF counter may be the same as the reference frequency counter in the numerical control system or may be a separate counter. Since the RF counter is not updated as in the case for the buffer phase counter, a particular count of the RF counter may be used as a constant reference index for the motor in threadcutting operations. In the specific example described herein the count of RF 999 is used as the indexing count for the motor at the beginning of the threadcutting mode operation.

The operation of the indexing circuit is as follows. The circuit is initially ready for starting when the signal EOB is high, the $\overline{EOB\ PULSE}$ signal is high, any range forcing is finished, and if operating at low range, the low range ready pulse has been generated. All of these conditions will place gate 726 in the ready condition by raising all inputs except the input from gate 730. As soon as the next EOC pulse arrives, the output of gate 730 will go high causing the output of gate 726 to go low. The latter output shifts a logic 1 on the EOB line into the start 1 stage of a shift register 744. When in this condition, the output from the start 1 stage is applied to the gate 724 thereby lowering the output of gate 724 and holding the output of gate 720 in the high condition. The next shift of shift register 744 occurs when the EOC pulse is in time coincidence with RF 999. As is apparent from the logic, the occurrence of an EOC pulse raises one of the inputs to gate 726 and the occurrence of RF 999 raises another input to the gate 726. The next shift of the contents of register 744 will occur when the following EOC pulse is in time coincidence with another RF 999 indication. This will place the shift register 744 in the start three position. That is, the stages start one, start two, and start three will be in the set condition. When the start three stage is in the set condition, the EOC pulse no longer controls shifting. Instead, shifting is controlled by the gate 728 and the phase change pulse (PHCHGPLS) input to the gate 728. When a phase change pulse occurs in coincidence with RF 999, the shift register goes to a start four condition. In the start four condition a threadcutting permit signal (THCPRMT) will be generated.

While the above description has concentrated on the specific case of threadcutting in numerical control systems and specific logic, it will be apparent that the specifics of the described system are offered only by way of example. The pulse generator of the present invention generates pulses at a rate dependent upon the rate of phase change of a waveform with respect to some reference. Each group of output pulses is generated in response to periodically detected phase changes and are time controlled to substantially evenly spread said pulses over the period between detected phase changes.

What I claim as new and desire to secure by Letters Patent of the United States is:

1. A control responsive to an input signal of a recurrent nature having a phase which may vary with respect to some reference phase, said control comprising a system clock, means responsive to said input signal and to said system clock for generating an input phase pulse at a time representing the phase of said input signal and synchronized with said system clock, means responsive to said system clock for generating a reference waveform of substantially the same recurrence rate at said input waveform, means for recurrently comparing the phase represented by said input phase pulse and the phase of said reference waveform and for storing an indication of the sense of the phase difference and a quantity dependent upon the amount of phase difference, means responsive to a recurrent control signal and to said stored indication for generating output pulses at a rate not greater than the recurrence rate of said recurrent signal and whose number is dependent upon said stored quantity and is a measure of said phase difference.

2. A control as claimed in claim 1 in which said stored quantity dependent on the phase difference is stored in digital form.

3. A control as claimed in claim 1 further comprising means responsive to the generation of said output pulses and to said stored indication of phase sense for varying the phase of said reference waveform to bring said reference waveform substantially in phase with said input phase pulse.

4. A control responsive to an input signal of a recurrent nature having a phase which may vary with respect to some reference phase, said control comprising a system clock, means responsive to said input signal and to a system clock for generating an input phase pulse at a time representing the phase of said input signal and synchronized with said system clock, range control means for generating range control signals indicating low, medium and high rates of change of said input signal, comparison means for periodically comparing the phases of said input signal and a reference signal of substantially the same recurrence rate as said input signal, means for storing a quantity dependent upon the number of discrete units of timing periods between the phases of said input and reference signals, wherein said timing periods are increased in length by a scale factor in response to a high range control signal, output means for generating a number of output pulses equal to said number of discrete units of timing periods in the absence of either a low or high range control signal, and for generating a number of output pulses equal to a scale factor times said number of discrete units of timing periods in response to a low range control signal.

5. A control as claimed in claim 4 further comprising pulse rate spreading means responsive to a said low range control signal for substantially evenly spreading said output pulses over the time between detection of phase differences.

6. A control comprising phase comparison means for comparing the phase of an input signal of recurrent nature and a reference waveform of substantially the same recurrence rate, means for storing an indication of the phase difference between said phase compared signals, an incrementable register, means responsive to said comparison for incrementing said register a number of increments indicative of said phase difference, means responsive to the number stored in said register being different than some reference number and to a periodic control signal for generating sets of signals each comprising output pulses and incrementations of said register until the number stored in said register is said reference number.

7. A control as claimed in claim 6 further comprising means responsive to the generation of said output pulses for varying the phase of said reference waveform to bring said reference waveform substantially in phase with said input phase pulse.

8. A control as claimed in claim 7 wherein said means for comparing and storing comprises a first register which receives input pulses applied thereto and may recycle after N input pulses, and means responsive to the phase difference between said input phase pulse and said reference waveform for applying a number of input pulses to said first register to cause said first register to progress to a quantity which differs from the initial position of said register by an amount indicative of said phase difference.

9. A control as claimed in claim 8 wherein said means for generating output pulses comprises, single pulse generating means for generating a single output pulse only when enabled and when said comparison is over and provided said first register does not contain a representation of said reference condition, feedback pulse generating means for generating feedback pulses substantially coincident with said output pulses, and enabling means responsive to each period of said periodic control signal for enabling said single pulse generating means whereby the recurrence rate of said recurrent control signal controls the maximum output rate of said output pulses.

10. A control as claimed in claim 9 further comprising range control means responsive to the rate of change of phase of said input signal for generating a plurality of range control signals appropriate for different rates of phase change.

11. A control as claimed in claim 10 wherein said means for comparing and storing comprises, a second register, means connecting said feedback pulses to the input of said second register to increment said second register, second register feedback means for providing, when not blocked, repetitive pulses to increment said second register, means responsive to appropriate ones of said range control signals for blocking said feedback means, and means responsive to said second register being in a predetermined state for blocking said feedback means and for connecting said output feedback pulse applied to said second register to the input of said first register.

12. A control as claimed in claim 11 wherein said means for applying a number of inputs to said first register comprises, means for generating first lead and lag zone gating signals which define respectively N discrete small time periods on both sides of the zero phase of the reference waveform, means for generating second lead and lag zone gating signals which are a scale factor larger than said first lead and lag zone gating signals and which define N discrete larger time periods which are a scale factor larger than said small time periods, means responsive to a higher range control signal for changing the condition of said first register by an amount indicative of X where X is the number of large discrete time periods separating the phase of said reference waveform and said input phase pulse, and means in the absence of said higher range control signal for changing the condition of said first register by an amount indicative of X where X is the number of small discrete time periods separating the phase of said reference waveform and said input phase pulse.

13. A control as claimed in claim 12 further comprising, means for generating a low range command signal, means responsive to a lower range control signal for applying said low range command signal to said single pulse generator whereby each said single output pulse is generated only in response to the application of a low range command signal, feedback control means responsive to the interval of time between the complete generation of a previously determined plurality of substantially evenly spaced pulses in a set of signals and the next detected phase difference, to minimize said interval.

14. A control as claimed in claim 13 wherein said input phase signal is developed by a resolver connected to a spindle motor and further comprising indexing means responsive to a signal indicative of the rotational position of said spindle motor for blocking said output pulses until said spindle motor reaches a predetermined rotational position.

15. A control comprising phase comparison means for comparing the phase of an input signal of recurrent nature and a reference waveform of substantially the same recurrence rate, means for storing an indication of the phase difference between said phase compared signals, a pulse counter which cycles after N input pulses and has a rest position corresponding to a count of R, means responsive to said comparison for applying a number of pulses indicative of said phase difference to said pulse counter to cause said counter to count from said rest position R the indicated number of pulses, means responsive to the count in said counter being different than said rest position count and to a periodic control signal for generating output pulses and feedback pulses at a maximum rate equal to the rate of said periodic control signal, and means for applying said feedback pulses to said pulse counter to progress said counter back to the rest position R.

16. A control as claimed in claim 1 in which said stored quantity dependent on the phase difference is stored in digital form, further comprising means responsive to the generation of said output pulses and to said stored indication of phase sense for varying the phase of said reference waveform to bring said reference waveform substantially in phase with said input phase pulse.

17. A control as claimed in claim 16 further comprising utilization means responsive to said stored indication of the sense of the phase difference for control purposes.